US012570207B2

(12) United States Patent
Wakasugi

(10) Patent No.: US 12,570,207 B2
(45) Date of Patent: Mar. 10, 2026

(54) VEHICLE HEADLIGHT WITH CONTROL UNIT CONFIGURED TO RECEIVE AN OBJECT DETECTION SIGNAL AND DECREASES AND INCREASES AN AMOUNT OF LIGHT IN REGIONS OF A LIGHT DISTRIBUTION PATTERN

(71) Applicant: KOITO MANUFACTURING CO., LTD., Tokyo (JP)

(72) Inventor: Tomoki Wakasugi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/994,896

(22) PCT Filed: Jul. 26, 2023

(86) PCT No.: PCT/JP2023/027353
§ 371 (c)(1),
(2) Date: Jan. 15, 2025

(87) PCT Pub. No.: WO2024/024830
PCT Pub. Date: Feb. 1, 2024

(65) Prior Publication Data
US 2026/0014928 A1      Jan. 15, 2026

(30) Foreign Application Priority Data

Jul. 28, 2022    (JP) ................................. 2022-121030
Aug. 12, 2022    (JP) ................................. 2022-129036

(51) Int. Cl.
B60Q 1/14                (2006.01)
(52) U.S. Cl.
CPC ........ B60Q 1/143 (2013.01); B60Q 2300/054 (2013.01); B60Q 2300/056 (2013.01);
(Continued)

(58) Field of Classification Search
CPC ............... B60Q 1/143; B60Q 2300/41; B60Q 2300/42; B60Q 2300/45; B60Q 2300/05; B60Q 2300/054; B60Q 2300/056
(Continued)

(56) References Cited

U.S. PATENT DOCUMENTS 9,550,448 B2 *    1/2017   Tanaka .................. F21S 41/143
2019/0092222 A1   3/2019   Waragaya et al.
(Continued)

FOREIGN PATENT DOCUMENTS

EP         2281719 A1    2/2011
JP       2008-143505 A    6/2008
(Continued)

OTHER PUBLICATIONS

International Search Report for PCT/JP2023/027353 dated Aug. 22, 2023.

*Primary Examiner* — Robert J May
(74) *Attorney, Agent, or Firm* — Sughrue Mion, PLLC

(57)                ABSTRACT
A vehicle headlight includes a light unit and a control unit. When the plurality of predetermined objects is located in front of the vehicle, the control unit decreases an amount of light in a first region individually overlapping at least a part of each of the predetermined objects in an ADB light distribution pattern, increases an amount of light in a second region following at least a part of an outer edge of each of the first regions and sets a light increase rate in an overlapping region, in which at least a part of one of two of the second regions and the other of the two second regions overlap each other, to be lower than a sum of a light increase rate in one of the two second regions and a light increase rate in the other of the two second regions.

20 Claims, 9 Drawing Sheets

(52) U.S. Cl.
CPC ...... *B60Q 2300/41* (2013.01); *B60Q 2300/42*
(2013.01); *B60Q 2300/45* (2013.01)

(58) Field of Classification Search
USPC ......................................................... 362/465
See application file for complete search history.

(56)                      References Cited

U.S. PATENT DOCUMENTS

| | | |
|---|---|---|
| 2021/0301996 A1 | 9/2021 | Kito et al. |
| 2023/0382289 A1 | 11/2023 | Watano et al. |

FOREIGN PATENT DOCUMENTS

| | | |
|---|---|---|
| JP | 2011-031807 A | 2/2011 |
| JP | 2018-172038 A | 11/2018 |
| JP | 2019-059265 A | 4/2019 |
| WO | 2020/027301 A1 | 2/2020 |
| WO | 2022/080425 A1 | 4/2022 |

* cited by examiner

FIG. 8

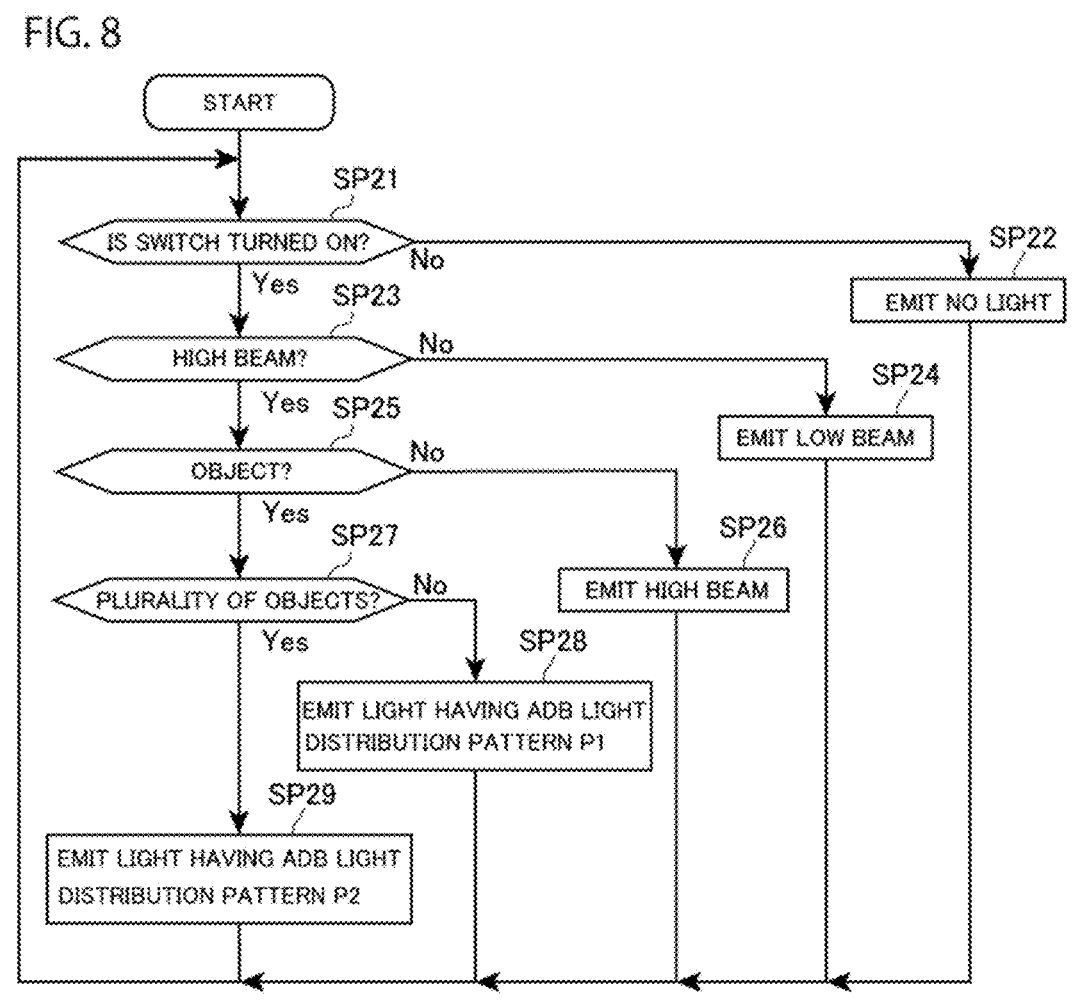

```
                        ┌──────────┐
                        │  START   │
                        └────┬─────┘
                             │                    SP21
                             ▼
         ┌──────────────────────────────────┐  No
         │      IS SWITCH TURNED ON?         │──────────────────────────┐
         └──────────────────────────────────┘                          │   SP22
                          │ Yes    SP23                                 ▼
                          ▼                                   ┌──────────────────┐
         ┌──────────────────────────────────┐  No            │  EMIT NO LIGHT   │
         │            HIGH BEAM?             │──────────┐     └──────────────────┘
         └──────────────────────────────────┘          │         SP24
                          │ Yes    SP25                 │
                          ▼                             ▼
         ┌──────────────────────────────────┐  No  ┌──────────────────┐
         │             OBJECT?               │────┐ │  EMIT LOW BEAM   │
         └──────────────────────────────────┘    │ └──────────────────┘
                          │ Yes    SP27           │     SP26
                          ▼                       ▼
         ┌──────────────────────────────────┐ No ┌──────────────────┐
         │       PLURALITY OF OBJECTS?       │──┐ │  EMIT HIGH BEAM  │
         └──────────────────────────────────┘  │ └──────────────────┘
                          │ Yes                 │    SP28
                          │                     ▼
                          │         ┌────────────────────────────┐
                          │         │  EMIT LIGHT HAVING ADB LIGHT│
                          │         │  DISTRIBUTION PATTERN P1    │
                          │         └────────────────────────────┘
             SP29         │
                          ▼
         ┌────────────────────────────┐
         │  EMIT LIGHT HAVING ADB LIGHT│
         │  DISTRIBUTION PATTERN P2    │
         └────────────────────────────┘
```

VEHICLE HEADLIGHT WITH CONTROL UNIT CONFIGURED TO RECEIVE AN OBJECT DETECTION SIGNAL AND DECREASES AND INCREASES AN AMOUNT OF LIGHT IN REGIONS OF A LIGHT DISTRIBUTION PATTERN

CROSS REFERENCE TO RELATED APPLICATIONS

This application is a National Stage of International Application No. PCT/JP2023/027353 filed Jul. 26, 2023, claiming priority based on Japanese Patent Application No. 2022-121030 filed Jul. 28, 2022, and Japanese Patent Application No. 2022-129036 filed Aug. 12, 2022.

TECHNICAL FIELD

The present invention relates to a vehicle headlight.

BACKGROUND ART

As a vehicle headlight typified by an automobile headlight, a vehicle headlight that changes a light distribution pattern of light to be emitted has been known, and Patent Literature 1 discloses such a vehicle headlight.

The vehicle headlight described in Patent Literature 1 includes a light unit capable of changing a light distribution pattern of light to be emitted, and a control unit. The control unit controls the light unit, based on information from a detection device that detects another vehicle located in front of the vehicle to emit light to the periphery of the another vehicle while suppressing emission of light to the another vehicle. Therefore, the vehicle headlight according to Patent Literature 1 is capable of suppressing glare to a driver of another vehicle located in front of the vehicle.

[Patent Literature 1] JP 2011-031807 A

SUMMARY OF INVENTION

A vehicle headlight according to a first aspect of the present invention includes: a light unit configured to change a light distribution pattern of light to be emitted; and a control unit configured to receive a signal from a detection device that detects a predetermined object located in front of a vehicle and control the light unit, in which, as compared with a case where no predetermined object is located in front of the vehicle, when a plurality of predetermined objects is located in front of the vehicle, the control unit decreases an amount of light in a first region individually overlapping at least a part of each of the predetermined objects of the light distribution pattern, increases an amount of light in a second region following at least a part of an outer edge of each of the first regions, and sets a light increase rate in an overlapping region, in which at least a part of one of two of the second regions and the other of the two second regions overlap each other, to be lower than a sum of a light increase rate in one of the two second regions and a light increase rate in the other of the two second regions.

In the vehicle headlight according to the first aspect, the second region makes it possible to suppress the periphery of each of the first regions where the amount of light decreases from appearing dark, suppressing a decrease in visibility ahead of the vehicle, as compared with a case where there is no second region. By the way, when the amount of light in each of the second regions increases, the overlapping region becomes bright according to each of the second regions. Therefore, in the vehicle headlight according to the first aspect, the light increase rate in the overlapping region is lower than the sum of the light increase rate in one of the two second regions and the light increase rate in the other of the two second regions. As a result, as compared with a case where the light increase rate in the overlapping region, where the second regions overlap each other, is a light increase rate obtained by adding the light increase rate in one of the two second regions to the light increase rate in the other of the two second regions, the overlapping region can be suppressed from becoming bright. Therefore, it is possible to suppress the overlapping region from becoming too bright, suppressing the driver of the host vehicle from feeling uncomfortable.

In the vehicle headlight according to the first aspect, the control unit may set the light increase rate in the overlapping region to an average of the light increase rate in one of the two second regions and the light increase rate in the other of the two second regions.

According to this configuration, it is possible to suppress a steep change in brightness between one of the two second regions, the overlapping region, and the other of the two second regions, suppressing the driver of the host vehicle from feeling uncomfortable.

Alternatively, in the vehicle headlight according to the first aspect, the control unit may set the light increase rate in the overlapping region to be equal to the light increase rate in one of the two second regions or the light increase rate in the other of the two second regions.

According to this configuration, the burden on the control unit can be reduced as compared with that in a case where the control unit changes the light increase rate in the overlapping region to a light increase rate different from both the light increase rate in one of the two second regions and the light increase rate in the other of the two second regions.

In this case, in the vehicle headlight according to the first aspect, the control unit may set the light increase rate in the overlapping region to be equal to the higher one of the light increase rate in one of the two second regions and the light increase rate in the other of the two second regions.

A space between adjacent ones of the first regions tends to appear dark. According to this configuration, as compared with a case where the light increase rate in the overlapping region is equal to the lower one of the light increase rate in one of the two second regions and the light increase rate in the other of the two second regions, the overlapping region between adjacent ones of the first regions becomes bright, making it possible to suppress a decrease in visibility ahead of the vehicle.

Alternatively, in the vehicle headlight according to the first aspect, the control unit may set the light increase rate in the overlapping region to be higher than the lower one of the light increase rate in one of the two second regions and the light increase rate in the other of the two second regions.

According to this configuration, as compared with a case where the light increase rate in the overlapping region is equal to or lower than the lower one of the light increase rate in one of the two second regions and the light increase rate in the other of the two second regions, the overlapping region becomes bright, making it possible to suppress a decrease in visibility ahead of the vehicle.

Alternatively, in the vehicle headlight according to the first aspect, the control unit may set the light increase rate in the overlapping region to be higher than the higher one of the light increase rate in one of the two second regions and the light increase rate in the other of the two second regions.

According to this configuration, as compared with a case where the light increase rate in the overlapping region is equal to or lower than the higher one of the light increase rate in one of the two second regions and the light increase rate in the other of the two second regions, the overlapping region becomes bright, making it possible to suppress a decrease in visibility ahead of the vehicle.

As described above, according to the first aspect of the present invention, it is possible to provide a vehicle headlight capable of suppressing a driver of a host vehicle from feeling uncomfortable.

A vehicle headlight according to a second aspect of the present invention includes: a light unit configured to change a light distribution pattern of light to be emitted; and a control unit configured to receive a signal from a detection device that detects a predetermined object located in front of a vehicle and control the light unit, in which, as compared with a case where no predetermined object is located in front of the vehicle, in a first state in which the predetermined object is located in front of the vehicle, the control unit controls the light unit such that, in the light distribution pattern, an amount of light in a first region overlapping at least a part of the predetermined object decreases, and an amount of light in a second region surrounding the first region increases, and when the first state is changed to a second state in which the predetermined object and another predetermined object are located in front of the vehicle, the control unit controls the light unit such that, in the light distribution pattern, an amount of light in another first region overlapping at least a part of the another predetermined object decreases, and an amount of light in a specific region increases over time to a predetermined amount, the specific region being a region other than the first region, the another first region, and the second region inside a frame surrounding the first region, the another first region, and at least a part of a region between the first region and the another first region.

In the vehicle headlight according to the second aspect, in the first state in which the predetermined object is located in front of the vehicle, a first region overlapping at least a part of the predetermined object and having a reduced amount of light and a second region surrounding the first region and having an increased amount of light are provided. That is, an adaptive driving beam (ADB) light distribution pattern is formed. Therefore, the vehicle headlight according to the second aspect is capable of suppressing the periphery of the darkened first region from appearing dark while decreasing the amount of light irradiated to the predetermined object, suppressing a decrease in visibility ahead of the vehicle. In addition, when the first state is changed to the second state in which another predetermined object is further located in front of the vehicle, another first region in which the amount of light decreases by overlapping at least a part of the another predetermined object is provided. Therefore, the vehicle headlight according to the second aspect is capable of reducing the amount of light irradiated to the another predetermined object. In addition, when the first state is changed to the second state, the amount of light in the specific region increases over time to the predetermined amount. This specific region is a region other than the first region, the another first region, and the second region inside the frame surrounding the first region, the another first region, and at least a part of a region between the first region and the another first region. Therefore, the vehicle headlight according to the second aspect is capable of suppressing the periphery of each of the first region and the another first region, which are regions to be darkened, and the region between the first region and the another first region from appearing dark, suppressing a decrease in visibility ahead of the vehicle. In addition, the vehicle headlight according to the second aspect is capable of suppressing the driver from feeling uncomfortable as compared with a case where the amount of light in the specific region instantaneously reaches the predetermined amount. Therefore, the vehicle headlight according to the second aspect is capable of suppressing a decrease in visibility while suppressing the driver from feeling uncomfortable, when the amount of light in the region overlapping at least a part of the predetermined object decreases.

In the vehicle headlight according to the second aspect, the control unit may control the light unit such that a total amount of light that decreases in the first region and the another first region is equal to a total amount of light that increases in the second region and the specific region.

With such a configuration, it is possible to suppress an increase in energy consumption as compared with that in a case where the total amount of light that increases in the second region and the specific region is larger than the total amount of light that decreases in the first region and the another first region.

In the vehicle headlight according to the second aspect, the control unit may control the light unit such that a region where the amount of light increases of the specific region spreads over time from a second region side toward an another first region side.

In this case, in the vehicle headlight according to the second aspect, the control unit may control the light unit such that, during a period in which the amount of light in the specific region increases, a light increase rate in the region where the amount of light increases of the specific region based on a case where no predetermined object is located in front of the vehicle is equal to a light increase rate in the second region based on the case.

With such a configuration, it is possible to make it difficult for the driver to visually recognize a boundary between the second region and the region where the amount of light increases of the specific region during the period in which the amount of light increases in the specific region.

In the vehicle headlight according to the second aspect, the control unit may control the light unit such that a region where the amount of light increases of the specific region spreads over time from an another first region side toward a second region side. In addition, the control unit may control the light unit such that the amount of light increases over time in the entire specific region.

In the vehicle headlight according to the second aspect, the control unit may control the light unit such that a light increase rate in the specific region based on a case where no predetermined object is located in front of the vehicle is equal to a light increase rate in the second region based on the case, in a state where the amount of light in the specific region has reached the predetermined amount.

With such a configuration, it is possible to make it difficult for the driver to visually recognize a boundary between the second region and the specific region in a state where the amount of light in the specific region has reached the predetermined amount.

In the vehicle headlight according to the second aspect, the control unit may control the light unit such that the frame has a minimum rectangular shape.

With such a configuration, for example, it is possible to reduce the control load of the control unit as compared with that in a case where the frame is circular.

In this case, in the vehicle headlight according to the second aspect, the control unit may control the light unit such that, during at least a part of a period in which the amount of light in the specific region increases, an amount of light in a region located outside the frame of the second region decreases over time and returns to an amount of light when no predetermined object is located in front of the vehicle.

The vehicle headlight according to the second aspect is capable of increasing the amount of light in the specific region while suppressing an increase in energy consumption, as compared with those in a case where the amount of light in the region located outside the frame of the second region is not returned to the original amount of light.

In the vehicle headlight according to the second aspect, the control unit may control the light unit such that, as the specific region has a larger area, a period until the amount of light in the specific region reaches the predetermined amount is longer.

The larger the area of the region where the amount of light changes, the more likely the driver is to feel uncomfortable about the change in amount of light. Therefore, with such a configuration, it is possible to suppress the driver from feeling uncomfortable about the increase in amount of light in the specific region.

Alternatively, in the vehicle headlight according to the second aspect, the control unit may control the light unit such that, as a distance between the first region and the another first region is longer, a period until the amount of light in the specific region reaches the predetermined amount is longer.

As the distance between the first region and the another first region is longer, the area of the region between the first region and the another first region in the specific region tends to be larger. Therefore, with such a configuration, it is possible to suppress the driver from feeling uncomfortable about the increase in amount of light in the region between the first region and the another first region of the specific region.

In the vehicle headlight according to the second aspect, the control unit may control the light unit such that the frame coincides with an edge of the light distribution pattern when a ratio of a sum of areas of the first region and the another first region to an entire area of the light distribution pattern is equal to or higher than a predetermined value.

With such a configuration, it is possible to reduce the control load of the control unit.

In the vehicle headlight according to the second aspect, in the first state in which a plurality of predetermined objects is present, the control unit may control the light unit such that an amount of light decreases in a plurality of first regions corresponding to the respective predetermined objects, and the second region surrounds the plurality of first regions and includes at least a part of a region between adjacent ones of the first regions, and when the first state is changed to the second state, the control unit may control the light unit such that the frame surrounds the first regions, the another first region, and at least a part of a region between adjacent ones among the plurality of the first regions and the another first region, and the specific region is a region other than the first regions, the another first region, and the second region inside the frame.

In this case, in the vehicle headlight according to the second aspect, the control unit may control the light unit such that the frame coincides with an edge of the light distribution pattern when a total number of predetermined objects and other predetermined objects is equal to or larger than a predetermined number.

With such a configuration, it is possible to reduce the control load of the control unit.

As described above, according to the second aspect of the present invention, it is possible to provide a vehicle headlight suppress a decrease in visibility while suppressing the driver from feeling uncomfortable, when the amount of light in the region overlapping at least a part of the predetermined object decreases.

BRIEF DESCRIPTION OF DRAWINGS

FIG. 8 is a flowchart of control performed by a control unit in a second embodiment as a second aspect.

DESCRIPTION OF EMBODIMENTS

Figure 1:
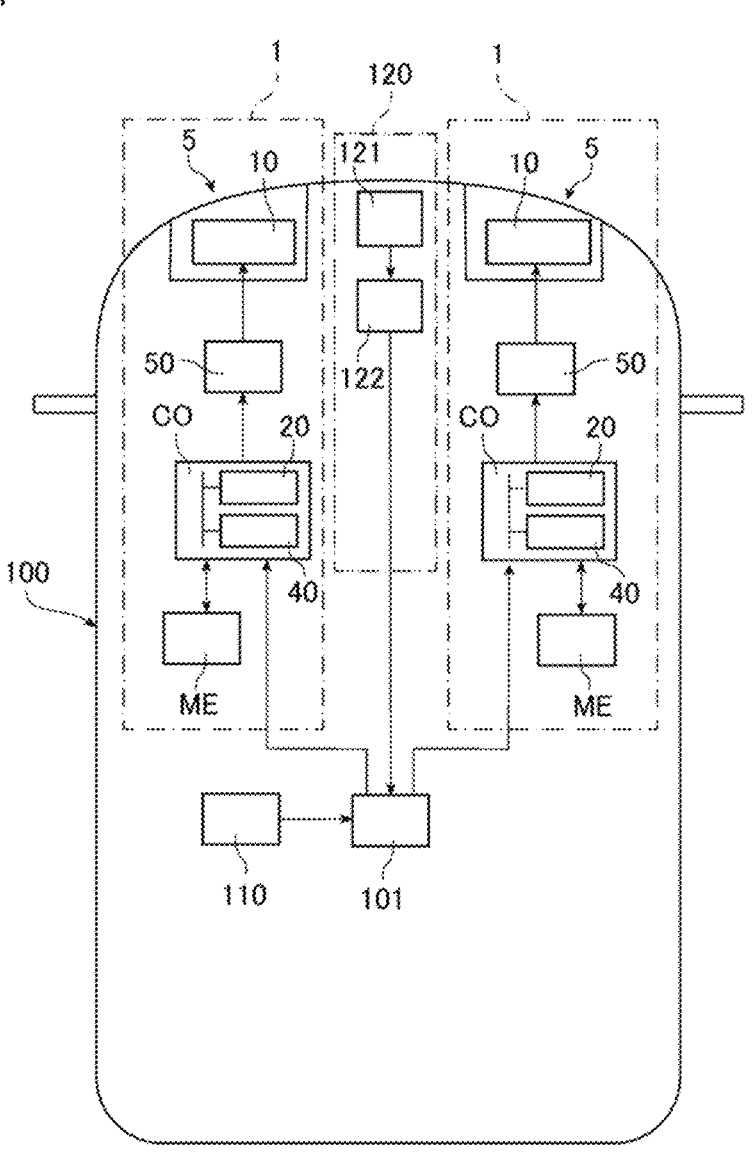
FIG. 1 is a plan view conceptually illustrating a vehicle including a vehicle headlight according to a first embodiment as a first aspect of the present invention.

Hereinafter, modes for carrying out a vehicle headlight according to the present invention will be exemplified together with the accompanying drawings. The following exemplary embodiments are intended to make it easy to understand the present invention, and are not intended to limit the present invention. The present invention can be modified and improved without departing from the gist thereof. In the drawings referred to below, dimensions of members may be changed for easy understanding.

First Embodiment

A first embodiment will be described as a first aspect of the present invention. FIG. 1 is a conceptual diagram of a vehicle including a vehicle headlight in the present embodiment. As illustrated in FIG. 1, a vehicle 100 includes a pair of left and right vehicle headlights 1, a light switch 110, a detection device 120, and an electronic control unit (ECU) 101. In the present specification, the "right" means a right side in the forward direction of the vehicle 100, the "left" means a left side in the forward direction of the vehicle 100, and the driver means a driver of the vehicle 100. The vehicle 100 of the present embodiment is an automobile.

Each of the vehicle headlights 1 includes a light part 5, a memory ME, a control unit CO, and a power supply circuit 50. In general, the light part 5 of one vehicle headlight 1 is disposed on the left side of the front portion of the vehicle 100, and the light part 5 of the other vehicle headlight 1 is disposed on the right side of the front portion of the vehicle 100. The configuration of one vehicle headlight 1 is the same as the configuration of the other vehicle headlight 1 except that the shapes of the light parts 5 are generally symmetrical in the left-right direction. Therefore, one vehicle headlight 1 will be described below, and the description of the other vehicle headlight 1 will be omitted.

Figure 2:
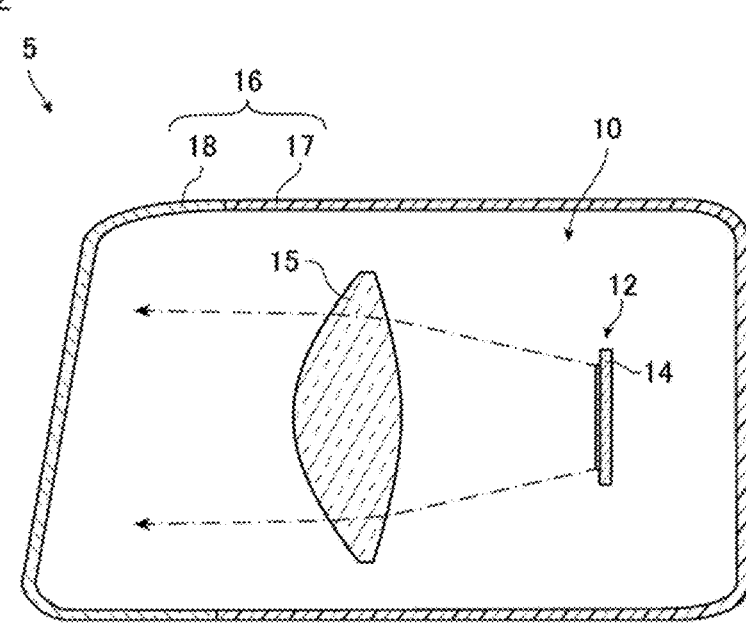
FIG. 2 is a cross-sectional view schematically illustrating a light part of one vehicle headlight illustrated in FIG. 1.

FIG. 2 is a cross-sectional view schematically illustrating the light part 5. The light part 5 includes a case 16 and a light unit 10.

The case 16 includes a housing 17 and a front cover 18. The housing 17 is formed like a box having an opening on the front side, and the front cover 18 is fixed to the housing 17 to close the opening. In this way, an accommodation space surrounded by the housing 17 and the front cover 18 is formed in the case 16, and the light unit 10 is disposed in the accommodation space. The front cover 18 transmits light emitted from the light unit 10. The power supply circuit 50, the control unit CO, and the memory ME are disposed outside the case 16, but may be disposed in the accommodation space of the case 16.

The light unit 10 can change a light distribution pattern of the light emitted therefrom. The light distribution pattern means both a shape of an image formed on a virtual vertical screen, for example, 25 m ahead of the vehicle 100 and a light intensity distribution in the image. The light unit 10 includes a light source unit 12 that emits light forward and a projection lens 15 disposed in front of the light source unit 12.

The projection lens 15 adjusts a divergence angle of light incident from the light source unit 12. The light whose divergence angle has been adjusted by the projection lens 15 is emitted forward of the vehicle 100 from the front cover 18.

Figure 3:
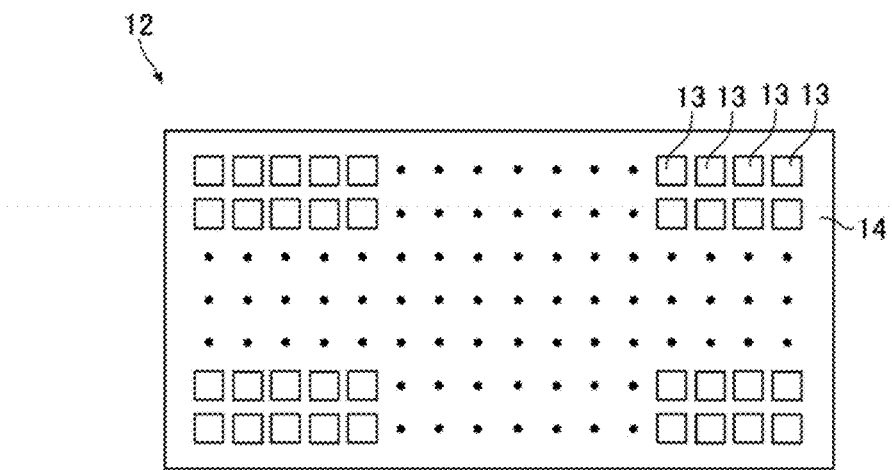
FIG. 3 is a front view schematically illustrating a light source unit illustrated in FIG. 2.

FIG. 3 is a front view schematically illustrating the light source unit 12 illustrated in FIG. 2. The light source unit 12 of the present embodiment includes a plurality of light emitting elements 13 as a light emitting unit that emits light forward, and a circuit board 14 on which the plurality of light emitting elements 13 is mounted. The light emitting elements 13 are arranged in a matrix and aligned in the up-down direction and the left-right direction. These light emitting elements 13 can individually change the amount of light emitted therefrom. In the present embodiment, the light emitting elements 13 are micro light emitting diodes (LEDs), and the light source unit 12 is a so-called micro LED array. The number of light emitting elements 13 arranged in each of the left-right direction and the up-down direction is not particularly limited.

In the present embodiment, each of the light emitting elements 13 corresponds to a pixel of an image generated by an image generation unit of the control unit CO to be described later. The light source unit 12 adjusts the amount of light emitted from each of the light emitting elements 13 according to data of the pixel corresponding to the light emitting element 13, thereby emitting light based on this image, and a light distribution pattern is formed based on this image by the light. In the present embodiment, the light emitting elements 13 and the pixels correspond to each other on a one-to-one basis, but are not particularly limited.

The memory ME illustrated in FIG. 1 is configured to store information and read the stored information. The memory ME is, for example, a non-transitory recording medium, and is preferably a semiconductor recording medium such as a random access memory (RAM) or a read only memory (ROM), but may include a recording medium of any format such as an optical recording medium or a magnetic recording medium. Note that the "non-transitory" recording medium includes all computer-readable recording media, except transitory propagating signals, and does not exclude volatile recording media. Various programs for controlling the light unit 10 and information necessary for the control are stored in the memory ME, and the control unit CO reads the programs and information stored in the memory ME. Note that the memory ME may be provided inside the control unit CO.

The control unit CO includes, for example, an integrated circuit such as a microcontroller, an integrated circuit (IC), a large-scale integrated circuit (LSI), or an application specific integrated circuit (ASIC), or a numerical control (NC) device. In addition, when the NC device is used, the control unit CO may be one that uses a machine learning device or one that does not use a machine learning device. The control unit CO is electrically connected to the ECU 101, and the control units CO in the respective vehicle headlights 1 are electrically connected to each other via the ECU 101. Note that the control units CO may be electrically connected to each other in a direct manner without the ECU 101.

The control unit CO of the present embodiment includes an image generation unit 20 and a light distribution control unit 40 in a state where various programs are read from the memory ME, and receives a signal from the detection device 120 via the ECU 101.

The image generation unit 20 generates an image based on the image stored in the memory ME. In the present embodiment, the image is a grayscale image in which data for each pixel is a gray value, and a pixel having a larger gray value is brighter. However, the data for each pixel is not particularly limited. Furthermore, the information of the image may be read from a memory outside the vehicle via a wireless communication device provided in the vehicle 100.

The image stored in the memory ME of the present embodiment is a low beam image for causing light emitted from the light source unit 12 to form a low beam light distribution pattern or a high beam image for causing light emitted from the light source unit 12 to form a high beam light distribution pattern. The image generation unit 20 of the present embodiment generates an adaptive driving beam (ADB) light distribution image by performing processing on the high beam image based on information indicated by the signal input from the detection device 120. The ADB light distribution image is an image indicating an ADB light distribution pattern in which a partial region of the high beam light distribution pattern is a first region where the amount of light is decreased, and a region following at least a part of an outer edge of the first region is a second region where the amount of light is increased.

The light distribution control unit 40 of the present embodiment controls the light unit 10 by controlling the power supply circuit 50 based on any one of information of the low beam image, information of the high beam image, and information of the image generated by the image generation unit 20, which are stored in the memory ME. That is, it can be understood that the control unit CO controls the light unit 10 using the signal from the detection device 120, the image generation unit 20, and the light distribution control unit 40.

The power supply circuit 50 includes a driver. When a control signal is input from the control unit CO to the power supply circuit 50, power supplied from a power supply (not illustrated) to each of the light emitting elements 13 of the light source unit 12 is adjusted by the driver. In this way, the amount of light emitted from each of the light emitting elements 13 is adjusted, and the light source unit 12 emits light based on the low beam image, the high beam image, or the ADB light distribution image. Then, low beam light, high beam light, or ADB light distribution pattern light is emitted from the light unit 10. Furthermore, in the present embodiment, the driver of the power supply circuit 50 adjusts the power supplied to each of the light emitting elements 13 by pulse width modulation (PWM) control, thereby adjusting the amount of light emission from each of the light emitting elements 13. However, the method of adjusting the amount of light emitted from each of the light emitting elements 13 is not particularly limited.

The light switch 110 of the present embodiment is a switch that selects whether to emit light. Furthermore, the light switch 110 selects whether to emit low beam light or high beam light. When the light switch 110 is turned on, a signal indicating emission of the selected light is output to the control unit CO via the ECU 101, and when the light switch 110 is turned off, no signal is output.

The detection device 120 of the present embodiment detects a predetermined object located in front of the vehicle 100. Examples of the object include another vehicle such as a preceding vehicle or an oncoming vehicle, a retroreflective object, a human such as a pedestrian, and an obstacle. The retroreflective object of the present embodiment is an object that does not emit light by itself and retroreflects emitted light at a predetermined spreading angle. Examples of the retroreflective object include a road sign and a visual guidance sign. The detection device 120 of the present embodiment includes an image acquisition unit 121 and a detection unit 122.

The image acquisition unit 121 acquires an image of an area ahead of the vehicle 100, and this image includes at least a part of a region that can be irradiated with light emitted from the pair of vehicle headlights 1. Examples of the image acquisition unit 121 include a charged coupled device (CCD) camera, a complementary metal oxide semiconductor (CMOS) camera, a light detection and ranging (LiDAR), a millimeter wave radar, and the like. The image acquisition unit 121 outputs a signal related to the acquired image to the detection unit 122.

The detection unit 122 has, for example, a configuration similar to that of the control unit CO. The detection unit 122 performs predetermined image processing on the image acquired by the image acquisition unit 121, and detects whether an object is present, a position at which the object is present in the image, the type of the object, and the like from the image subjected to the image processing.

For example, when an image in which a pair of white light spots or a pair of red light spots having a luminance higher than a predetermined luminance are present at a predetermined distance in the left-right direction is input from the image acquisition unit 121, the detection unit 122 detects the presence of another vehicle. For example, when an image in which a pair of white light spots are present is input from the image acquisition unit 121, the detection unit 122 identifies another vehicle as an oncoming vehicle. In addition, when an image in which a pair of red light spots are present is input from the image acquisition unit 121, the detection unit 122 identifies another vehicle as a preceding vehicle. For example, the pair of white light spots are headlights of the oncoming vehicle, and the pair of red light spots are taillights of the preceding vehicle. Note that the method of detecting or identifying an oncoming vehicle and a preceding vehicle is not particularly limited.

When detecting an object from the image, the detection unit 122 outputs a signal indicating information regarding the object to the control unit CO via the ECU 101. The information regarding the object includes the presence of the object, the position at which the object is present in the image, the type of the object, and the like. In addition, when detecting no object, the detection unit 122 outputs a signal indicating that no object is present to the control unit CO via the ECU 101, but it is not necessary for the detection unit 122 to output such a signal.

Note that the objects detected by the detection device 120, the number of types of objects, and the configuration of the detection device 120 are not particularly limited. For example, the image acquisition unit 121 may be a CCD camera and a LiDAR, and in this case, the detection unit 122 detects objects based on images acquired by the CCD camera and the LiDAR.

Next, the operation of the vehicle headlight 1 of the present embodiment will be described. In the present embodiment, the operations of the pair of vehicle headlights 1 are the same and synchronized with each other. Therefore, hereinafter, the operation of one vehicle headlight 1 will be described, and the description of the operation of the other vehicle headlight 1 will be omitted.

Figures 4, 5:
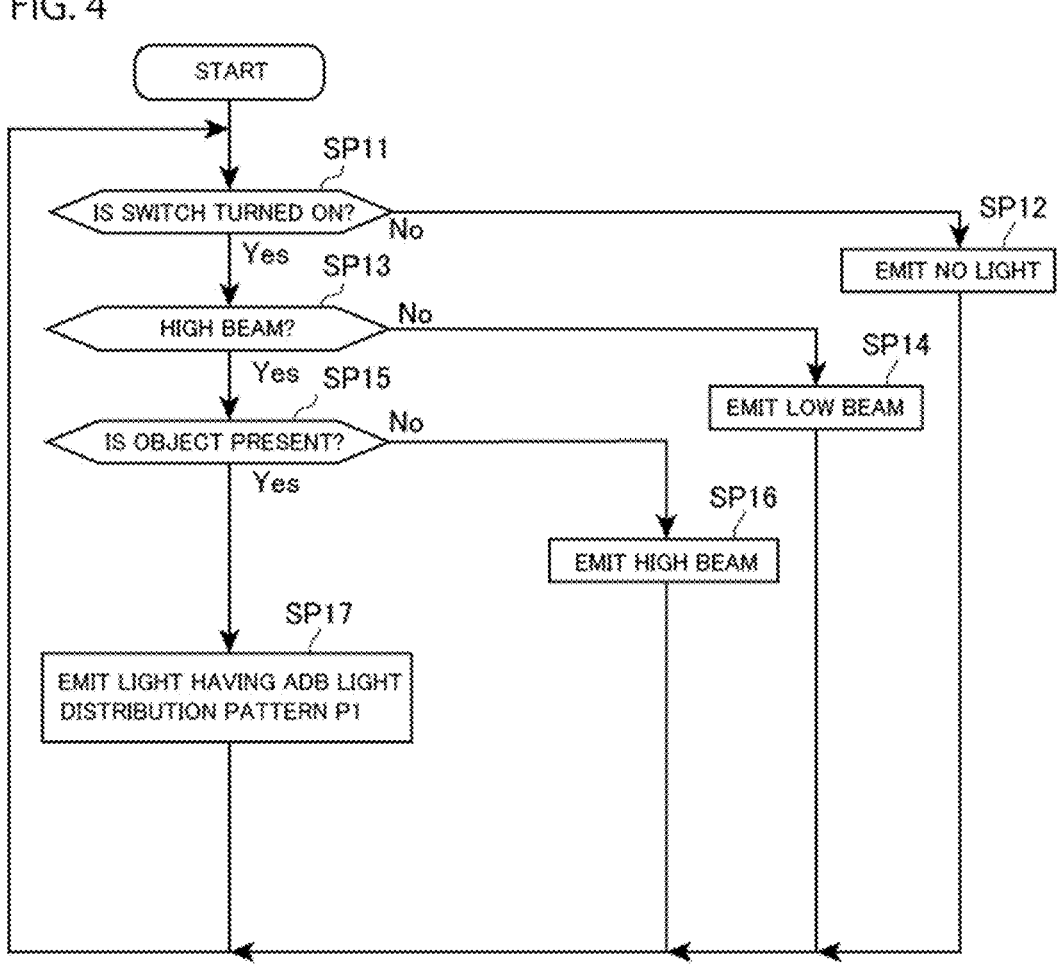
FIG. 4 is a flowchart of control performed by a control unit in the first embodiment.
FIG. 5 is a diagram illustrating an example of a high beam light distribution pattern in the first embodiment.

FIG. 4 is a flowchart of control performed by the control unit CO in the present embodiment. As illustrated in FIG. 4, the control flow includes steps SP11 to SP17. In the start state illustrated in FIG. 4, it is assumed that the image acquisition unit 121 of the detection device 120 acquires an image of an area ahead of the vehicle 100, and a signal is input to the control unit CO from the detection unit 122.

(Step SP11)

In this step, when no signal is input from the light switch 110, the control unit CO advances the control flow to step SP12, and when this signal is input, the control unit CO advances the control flow to step SP13.

(Step SP12)

In this step, the light distribution control unit 40 of the control unit CO controls the power supply circuit 50 not to emit light from the light unit 10. Accordingly, the vehicle headlight 1 emits no light. Then, the control unit CO returns the control flow to step SP11.

(Step SP13)

In this step, when a signal related to emission of low beam light is input from the light switch 110, the control unit CO advances the control flow to step SP14. In addition, when a signal related to emission of high beam light is input from the light switch 110, the control unit CO advances the control flow to step SP15.

(Step SP14)

In this step, the control unit CO controls the light unit 10 to emit a low beam from the vehicle headlight 1. Specifically, the image generation unit 20 reads the low beam image stored in the memory ME, and the light distribution control unit 40 controls the power supply circuit 50 based on the information of the low beam image to supply power to each of the light emitting elements 13 of the light source unit 12. By supplying the power in this manner, when a low beam is emitted, light is emitted from some of the light emitting elements 13, the light source unit 12 emits light based on the low beam image, and light having a low beam light distribution pattern is emitted from the vehicle headlight 1. In this way, the low beam is emitted from the vehicle headlight 1. Once the low beam is emitted from the vehicle headlight 1, the control unit CO returns the control flow to step SP11.

(Step SP15)

In this step, the control unit CO advances the control flow to step SP16 when a signal indicating that no object is present is input from the detection unit 122, and advances the control flow to step SP17 when a signal indicating information regarding an object is input from the detection unit 122.

(Step SP16)

In this step, the control unit CO controls the light unit 10 to emit a high beam from the vehicle headlight 1. Specifically, the image generation unit 20 reads the high beam image stored in the memory ME, and the light distribution control unit 40 controls the power supply circuit 50 based on the information of the high beam image to supply power to each of the light emitting elements 13 of the light source unit 12. By supplying the power in this manner, the light source unit 12 emits light based on the high beam image, and light having a high beam light distribution pattern is emitted from the vehicle headlight 1. In this way, when no object is present, a high beam is emitted from the vehicle headlight 1.

FIG. 5 is a diagram illustrating an example of a high beam light distribution pattern in the present embodiment. In FIG. 5, S represents a horizontal line, V represents a vertical line passing through the center of the vehicle 100 in the left-right direction, and a high beam light distribution pattern PH formed on a virtual vertical screen disposed 25 m ahead of the vehicle 100 is indicated by a thick line. In the present embodiment, when a high beam is emitted, light is emitted from all the light emitting elements 13, and the external shape of the high beam light distribution pattern PH is generally a horizontally-long rectangular shape. In addition, a hot zone, which is a region where the intensity of light is highest in the high beam light distribution pattern PH, is located on or near an intersection between the horizontal line S and the vertical line V. The intensity of light in the high beam light distribution pattern PH decreases outward from the hot zone. Once the high beam is emitted from the vehicle headlight 1, the control unit CO returns the control flow to step SP11.

(Step SP17)

In this step, the control unit CO controls the light unit 10 such that the light distribution pattern of light emitted from the vehicle headlight 1 becomes an ADB light distribution pattern corresponding to the object located in front of the vehicle 100 and detected by the detection device 120. In this step, it is assumed that a plurality of predetermined objects is detected.

Figure 6:
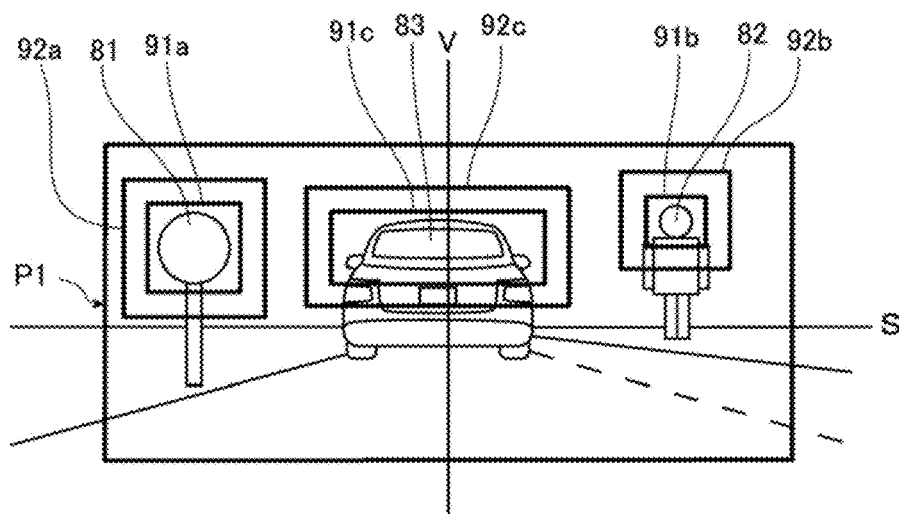
FIG. 6 is a diagram illustrating an example of an ADB light distribution pattern in the first embodiment, similarly to FIG. 5.

FIG. 6 is a diagram illustrating an example of an ADB light distribution pattern in the present embodiment, similarly to FIG. 5. The ADB light distribution pattern P1 is a light distribution pattern in which first regions 91a, 91b, and

91c and second regions 92a, 92b, and 92c are formed in the high beam light distribution pattern PH. Hereinafter, the first regions 91a, 91b, and 91c may be collectively referred to as the first region 91, and the second regions 92a, 92b, and 92c may be collectively referred to as the second region 92. Examples of the objects in this step include a retroreflective object 81, a human 82, and another vehicle 83. The retroreflective object 81 is a road sign, the human 82 is a pedestrian, and the another vehicle 83 is a preceding vehicle.

The first region 91a is a region overlapping the retroreflective object 81, and the amount of light in the first region 91a is smaller than the amount of light in the first region 91a of the high beam light distribution pattern PH. Therefore, according to the vehicle headlight 1 of the present embodiment, it is possible to reduce the amount of reflected light reflected by the retroreflective object 81 and directed to the vehicle 100, which is a host vehicle, suppressing glare to the driver caused by the reflected light. In the example illustrated in FIG. 6, the first region 91a has a rectangular shape overlapping the whole of the retroreflective object 81. However, from the viewpoint of suppressing glare to the driver, the first region 91a only needs to overlap at least a part of the retroreflective object 81, and the shape and size of the first region 91a are not limited.

The first region 91b is a region overlapping the human 82, and the amount of light in the first region 91b is smaller than the amount of light in the first region 91b of the high beam light distribution pattern PH. Therefore, according to the vehicle headlight 1 of the present embodiment, it is possible to reduce the amount of light irradiated to the human 82, suppressing glare to the human. In the example illustrated in FIG. 6, the first region 91b has a rectangular shape overlapping the head of the human 82, and first region 91b does not overlap most of the torso of the human 82. However, from the viewpoint of suppressing glare to the human 82, the first region 91b only needs to overlap at least a part of the head of the human 82, and the first region 91b may overlap the whole of the human 82, and the shape and size of the first region 91b are not limited.

The first region 91c is a region overlapping the another vehicle 83, and the amount of light in the first region 91c is smaller than the amount of light in the first region 91c of the high beam light distribution pattern PH. Therefore, according to the vehicle headlight 1 of the present embodiment, it is possible to reduce the amount of light irradiated to the another vehicle 83, suppressing glare to the driver of the another vehicle 83. In the example illustrated in FIG. 6, the first region 91c has a rectangular shape overlapping a portion above the license plate of the another vehicle 83. However, from the viewpoint of suppressing glare to the driver of the another vehicle 83, it is only required that the first region 91c overlap at least a part of a visible portion for the driver of the another vehicle 83 to view the outside of the vehicle. For example, the first region 91c may overlap the whole of the another vehicle 83, and the shape and size of the first region 91c are not limited. Note that the visible portion is, for example, a front window in a case where the another vehicle 83 is an oncoming vehicle, and is, for example, a side mirror, a rear window, an imaging device that images an area behind the vehicle, or the like in a case where the another vehicle 83 is a preceding vehicle, and the visible portion generally tends to be disposed above the license plate.

In the present embodiment, the first regions 91a, 91b, and 91c have the same brightness, and the first regions 91a, 91b, and 91c have the same amount of light per unit area. In the example illustrated in FIG. 6, the area of the first region 91a is larger than the area of the first region 91*b*, and the area of the first region 91*c* is larger than the area of the first region 91*a*. Then, the light reduction amount in the first region 91*a* is larger than the light reduction amount in the first region 91*b*, and the light reduction amount in the first region 91*c* is larger than the light reduction amount in the first region 91*a*.

It is only required that the first region 91 be a region that individually overlaps at least a part of each of the objects in the high beam light distribution pattern PH and has an amount of light reduced as compared with that in a case where the plurality of objects are not located in front of the vehicle 100. That is, it is only required that the amount of light in the first region 91 be smaller than an amount of light in a region corresponding to the first region 91 of the high beam light distribution pattern PH. Therefore, in a case where the plurality of objects is located in front of the vehicle 100, the control unit CO reduces the amount of light in the first region 91 individually overlapping at least a part of each of the objects as compared with that in a case where the plurality of objects are not located in front of the vehicle 100.

The second region 92*a* is a region following at least a part of the outer edge of the first region 91*a*. Similarly to the second region 92*a*, the second region 92*b* is a region following at least a part of the outer edge of the first region 91*b*, and the second region 92*c* is a region following at least a part of the outer edge of the first region 91*c*. In the example illustrated in FIG. 6, the second regions 92*a*, 92*b*, and 92*c* follow the whole of the outer edges of the first regions 91*a*, 91*b*, and 91*c* and surround the first regions 91*a*, 91*b*, and 91*c*. In this manner, the second regions 92 are individually provided for the respective first regions 91. In addition, the second regions 92 are regions where the amount of light is increased as compared with that in a case where the plurality of objects are not located in front of the vehicle 100. That is, the amount of light in each of the second regions 92*a*, 92*b*, and 92*c* of the ADB light distribution pattern P1 is larger than an amount of light in a region corresponding to each of the second regions 92*a*, 92*b*, and 92*c* of the high beam light distribution pattern PH in a case where the plurality of objects are not located in front of the vehicle 100. Therefore, in a case where the plurality of objects is located in front of the vehicle 100, the control unit CO increases the amount of light in the second region 92 following at least a part of the outer edge of each of the first regions 91 as compared with that in a case where the plurality of objects is not located in front of the vehicle 100. The second region 92 makes it possible to suppress the periphery of each of the first regions 91 where the amount of light decreases from appearing dark, suppressing a decrease in visibility ahead of the vehicle 100, as compared with the case where there is no second region 92.

In addition, the larger the light reduction amount in the first region followed by the second region, the larger the light increase amount that is an amount of light increased in each of the second regions 92*a*, 92*b*, and 92*c*. In the example illustrated in FIG. 6, as described above, the light reduction amount increases in the order of the first region 91*b*, the first region 91*a*, and the first region 91*c*. Accordingly, the light increase amount increases in the order of the second region 92*b*, the second region 92*a*, and the second region 92*c*. In the present embodiment, the larger the light reduction amount in the first region followed by the second region, the larger the light increase amount per unit area of the second region. Therefore, in the example illustrated in FIG. 6, the light increase amount per unit area increases in the order of the second region 92*b*, the second region 92*a*, and the second region 92*c*. In addition, in the present embodiment, the light increase amount in each of the second regions 92*a*, 92*b*, and 92*c* is equal to the light reduction amount in the first region followed by the second region. The width of each of the second regions 92*a*, 92*b*, and 92*c* in a direction perpendicular to the direction in which the second regions 92*a*, 92*b*, and 92*c* follow the outer edges of the first regions 91*a*, 91*b*, and 91*c* is generally constant in that direction, and the second regions 92*a*, 92*b*, and 92*c* have the same width. The widths of the second regions 92*a*, 92*b*, and 92*c* may be different from each other.

Figure 7:
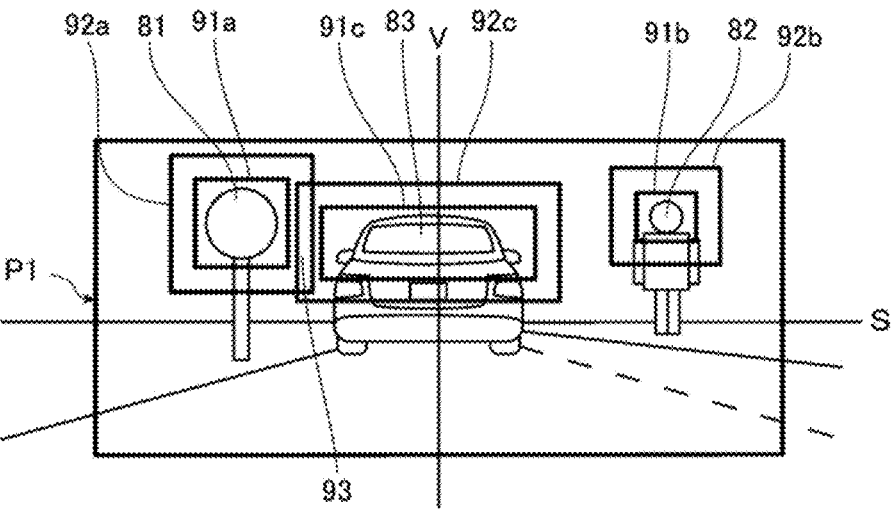
FIG. 7 is a diagram illustrating another example of an ADB light distribution pattern in the first embodiment, similarly to FIG. 5.

FIG. 7 is a diagram illustrating another example of an ADB light distribution pattern P1 in the present embodiment, similarly to FIG. 5. In the ADB light distribution pattern P1 illustrated in FIG. 7, at least a part of one second region 92 of two of the second regions 92 and the other second region 92 in the two second regions 92 overlap each other. In the example, it is illustrated that a part of one second region 92*a* of FIG. 6 overlaps a part of another second region 92*c* of FIG. 6, and this overlapping region is illustrated as an overlapping region 93.

In the present embodiment, the light increase rate in the overlapping region 93 is lower than the sum of the light increase rate in one second region 92*a* and the light increase rate in the other second region 92*c*. Each of the overlapping region 93, the one second region 92*a*, and the other second region 92*c* becomes brighter as the respective light increase rate become higher. In the present embodiment, the light increase rate is a rate at which the amount of light increases per unit area of each of the overlapping region 93, the one second region 92*a*, and the other second region 92*c* when the situation around the vehicle changes from a first situation in which objects are not located in front of the vehicle 100 and no overlapping region 93 is formed to a second situation in which a plurality of objects is located in front of the vehicle 100 and an overlapping region 93 is formed. For example, in the overlapping region 93, if the amount of light per unit area in the first situation is 100 and the amount of light per unit area in the second situation is 120, the light increase rate in the overlapping region 93 is 20%. For example, in a case where the light increase rate in one second region 92*a* is 10% and the light increase rate in the other second region 92*c* is 30%, the light increase rate in the overlapping region 93 is lower than 40%, which is the sum of the light increase rates in the second regions 92*a* and 92*c*. Note that these numerical values are values for convenience and do not represent actual values.

In the present embodiment, concerning the light increase rate in the overlapping region 93 lower than the sum of the light increase rate in one second region 92*a* and the light increase rate in the other second region 92*c*, the control unit CO sets the light increase rate in the overlapping region 93 to an average of the light increase rate in one second region 92*a* and the light increase rate in the other second region 92*c*. In a case where the light increase rates in the second regions 92*a* and 92*c* are 10% and 30% as described above, the light increase rate in the overlapping region 93 is 20%. According to this configuration, it is possible to suppress a steep change in brightness between one second region 92*a*, the overlapping region 93, and the other second region 92*c*, suppressing the driver of the host vehicle from feeling uncomfortable. Note that the control unit CO does not need to set the light increase rate in the overlapping region 93 to the average of the light increase rate in one second region 92*a* and the light increase rate in the other second region 92*c*.

In order to control light to have such an ADB light distribution pattern P1, in the present embodiment, the image generation unit 20 first reads the high beam image stored in the memory ME. Next, the image generation unit 20 generates an ADB light distribution image indicating an ADB light distribution pattern P1 by performing processing on the high beam image based on information regarding an object input from the detection device 120. The processing on the high beam image by the image generation unit 20 is processing in which regions corresponding to the first regions 91a, 91b, and 91c in the high beam image become dark, regions corresponding to the second regions 92a, 92b, and 92c become bright, and the light increase rate in the overlapping region 93 is adjusted as described above. By processing the high beam image in this manner, the image generation unit 20 generates an ADB light distribution image in which the brightness of some parts of the high beam image are changed. Next, based on the information of the generated ADB light distribution image, the light distribution control unit 40 controls the power supply circuit 50 to emit light based on the ADB light distribution image from the light source unit 12. As a result, light having the ADB light distribution pattern P1 is emitted from the vehicle headlight 1. Then, the control unit CO returns the control flow to step SP11.

Note that, although illustration is omitted, in a case where one object is detected by the detection device 120, the number of first regions is one, and the second region is one region following at least a part of the outer edge of the first region. If the plurality of second regions do not overlap each other, no overlapping region 93 is formed.

By the way, in a case where a first region overlapping another vehicle and having a reduced amount of light is formed as in the vehicle headlight of Patent Literature 1 described above, the driver of the host vehicle tends to feel dark not only in the first region but also in a second region around the first region, which may decrease visibility ahead of the vehicle. Therefore, the control unit may increase the amount of light in the second region. Meanwhile, in a case where a plurality of other vehicles is located ahead, a plurality of first regions may be formed, a second region may be formed around each of the first regions, and a part of one second region and a part of another second region may overlap each other among the second regions. In this case, a region where the second regions overlap each other becomes too bright, which may cause the driver of the host vehicle to feel uncomfortable.

Therefore, in the present embodiment, as described in step SP17, the control unit CO sets the light increase rate in the overlapping region 93 to be lower than the sum of the light increase rate in one second region 92a and the light increase rate in the other second region 92c.

As a result, as compared with a case where the light increase rate in the overlapping region 93 is a light increase rate obtained by adding the light increase rate in the other second region 92c to the light increase rate in one second region 92a, the overlapping region 93 where the second regions 92a and 92c overlap each other can be suppressed from becoming bright. Therefore, it is possible to suppress the overlapping region 93 from becoming too bright, suppressing the driver of the host vehicle from feeling uncomfortable.

Note that the control unit CO may set the light increase rate in the overlapping region 93 to be equal to the light increase rate in one second region 92a or the light increase rate in the other second region 92c. For example, in a case where the light increase rates in the second regions 92a and 92c are 10% and 30% as described above, the light increase rate in the overlapping region 93 is 10% or 30%. According to this configuration, the burden on the control unit CO can be reduced as compared with that in a case where the control unit CO changes the light increase rate in the overlapping region 93 to a light increase rate different from both the light increase rate in one second region 92a and the light increase rate in the other second region 92c. Note that the control unit CO does not need to set the light increase rate in the overlapping region 93 to be equal to the light increase rate in one second region 92a and the light increase rate in the other second region 92c.

In addition, the control unit CO may set the light increase rate in the overlapping region 93 to be equal to the higher one of the light increase rate in one second region 92a and the light increase rate in the other second region 92c. For example, in a case where the light increase rates in the second regions 92a and 92c are 10% and 30% as described above, the light increase rate in the overlapping region 93 is 30%. By the way, the area between the first regions 91a and 91c tends to appear dark. According to this configuration, as compared with a case where the light increase rate in the overlapping region 93 is equal to the lower one of the light increase rate in one second region 92a and the light increase rate in the other second region 92c, the overlapping region 93 between the first regions 91a and 91c becomes bright, making it possible to suppress a decrease in visibility ahead of the vehicle 100. Note that the control unit CO does not need to set the light increase rate in the overlapping region 93 to be equal to the higher one of the light increase rate in one second region 92a and the light increase rate in the other second region 92c. In addition, the control unit CO may set the light increase rate in the overlapping region 93 to be equal to the lower one of the light increase rate in one second region 92a and the light increase rate in the other second region 92c.

Alternatively, the control unit CO may set the light increase rate in the overlapping region 93 to be higher than the lower one of the light increase rate in one second region 92a and the light increase rate in the other second region 92c. For example, in a case where the light increase rates in the second regions 92a and 92c are 10% and 30% as described above, the light increase rate in the overlapping region 93 is higher than 10%. According to this configuration, as compared with a case where the light increase rate in the overlapping region 93 is equal to or lower than the lower one of the light increase rate in one second region 92a and the light increase rate in the other second region 92c, the overlapping region 93 becomes bright, making it possible to suppress a decrease in visibility ahead of the vehicle 100. Note that the control unit CO does not need to set the light increase rate in the overlapping region 93 to be higher than the lower one of the light increase rate in one second region 92a and the light increase rate in the other second region 92c.

Alternatively, the control unit CO may set the light increase rate in the overlapping region 93 to be higher than the higher one of the light increase rate in one second region 92a and the light increase rate in the other second region 92c. For example, in a case where the light increase rates in the second regions 92a and 92c are 10% and 30% as described above, the light increase rate in the overlapping region 93 is higher than 30%. According to this configuration, as compared with a case where the light increase rate in the overlapping region 93 is equal to or lower than the higher one of the light increase rate in one second region 92a and the light increase rate in the other second region 92c, the overlapping region 93 becomes bright, making it possible to suppress a decrease in visibility ahead of the vehicle 100. Note that the control unit CO does not need to set the light increase rate in the overlapping region 93 to be higher than the higher one of the light increase rate in one second region 92a and the light increase rate in the other second region 92c. Further, the control unit CO may set the light increase rate in the overlapping region 93 to a light increase rate between the light increase rate in one second region 92a and the light increase rate in the other second region 92c.

From the viewpoint of suppressing the periphery of each of the first regions 91a, 91b, and 91c from appearing dark, each of the second regions 92a, 92b, and 92c preferably follow half or more of the outer edge of each of the first regions 91a, 91b, and 91c, and more preferably follow the whole of the outer edge of each of the first regions 91a, 91b, and 91c. In addition, when parts of the outer edges of the first regions 91a, 91b, and 91c also serves as parts of the outer edge of the high beam light distribution pattern PH, the second regions 92a, 92b, and 92c preferably follow half or more of portions other than the portions that also serve as the outer edge of the high beam light distribution pattern PH of the outer edges of the first regions 91a, 91b, and 91c, and more preferably follow the whole of the portions.

Although the first aspect of the present invention has been described by taking the first embodiment as an example, the first aspect of the present invention is not limited thereto.

The method for adjusting the amount of light in each of the first region and the second region is not particularly limited. For example, the plurality of predetermined objects may be road signs having the same material and reflectance, and it is assumed that two road signs are arranged at the same distance from and in front of the vehicle 100 with a space therebetween. In this case, as compared with a case where the road signs are not arranged in front of the vehicle 100, the control unit CO reduces the amount of light in the first region individually overlapping at least a part of each of the road signs, and increases the amount of light in the second region following at least a part of the outer edge of each of the first regions. In addition, in a case where the space between the road signs described above decreases and an overlapping region is formed, the control unit CO may set the light increase rate in the overlapping region 93 to be lower than the sum of the light increase rate in one second region 92a and the light increase rate in the other second region 92c.

As described above, in the first embodiment, the example using the increase rate has been described, and the light increase rate has been expressed as a percentage. However, a light amount increase magnification per unit area in the second situation with respect to the first situation for each of the overlapping region 93, one second region 92a, and the other second region 92c may be used. For example, in the overlapping region 93, if the amount of light per unit area in the overlapping region 93 in the first situation is 100 and the amount of light per unit area in the overlapping region 93 in the second situation is 120, the increase magnification in the overlapping region 93 is 1.2. Note that these numerical values are values for convenience and do not represent actual light amount values. In addition, the increase magnification in one second region 92a is an increase magnification obtained from the rate at which the amount of light increases per unit area in the second situation with respect to the first situation in one second region 92a, and the increase magnification in the other second region 92c is an increase magnification obtained from the rate at which the amount of light increases per unit area in the second situation with respect to the first situation in the other second region 92c. In a case where the increase magnification is used, the increase magnification in the overlapping region 93 may be lower than the product of the increase magnification in one second region 92a and the increase magnification in the other second region 92c. For example, in a case where the increase magnification in one second region 92a is 1.2 and the increase magnification in the other second region 92c is 1.3, the increase magnification in the overlapping region 93 is set to be lower than 1.56, which is the product of the increase magnification in one second region 92a and the increase magnification in the other second region 92c. As a result, the overlapping region 93 can be suppressed from becoming bright as compared with a case where the increase magnification in the overlapping region 93 is equal to or higher than the product of the increase magnification in one second region 92a and the increase magnification in the other second region 92c. Therefore, it is possible to suppress the overlapping region 93 from becoming too bright, suppressing the driver of the host vehicle from feeling uncomfortable. Each of the increase magnification in the one second region 92a and the increase magnification in the other second region 92c is preferably, for example, within 2 times.

In the example illustrated in FIG. 7, the second regions 92a, 92b, and 92c follow the whole of the outer edges of the first regions 91a, 91b, and 91c. However, the second regions 92a, 92b, and 92c are not particularly limited as long as at least a part of one second region 92 and another second region 92 overlap to form an overlapping region 93. For example, in the vertical direction, the second region 92a may be provided along a right edge of the first region 91a, and the second region 92c may be provided along a left edge of the first region 91c. In this case, at least a part of one second region 92a and the other second region 92c overlap to form an overlapping region 93.

It has been described as an example that the overlapping region 93 is formed by the second region 92a and the second region 92c, but the overlapping region 93 may be formed by the second region 92b and the second region 92c. Furthermore, for example, in a case where the human 82 is located to the left of the retroreflective object 81, the overlapping region 93 may be formed by the second region 92a and the second region 92b.

For example, in the first embodiment, it has been described as an example that the first regions 91a, 91b, and 91c, the second regions 92a, 92b, and 92c, and the overlapping region 93 are formed in the high beam light distribution pattern PH. However, the light distribution pattern PH in which these regions are formed is not limited, and for example, these regions may be formed in an additional light distribution pattern that is added to a low beam light distribution pattern to form a high beam light distribution pattern PH. In this case, low beam light is emitted from a light unit different from the light unit 10, and the light unit 10 emits light having an additional light distribution pattern.

In the first embodiment, it has been described as an example that the plurality of first regions 91a, 91b, and 91c have the same brightness. However, the brightness of the first region is not limited, and for example, the amount of light in the first region may be zero, and the first region may be a light shielding region that is not irradiated with light. In addition, at least two of the plurality of first regions may have different brightnesses, and for example, the first regions may have different brightnesses depending on overlapping objects. For example, the first region 91c overlapping the another vehicle 83 may be darker than the first region 91*a* overlapping the retroreflective object 81. According to such a configuration, it is possible to suppress a decrease in visibility with respect to the retroreflective object 81 while suppressing glare to the driver of the another vehicle 83. In addition, the first region 91*a* may be brighter than the first region 91*b* overlapping the human 82. According to such a configuration, it is possible to suppress a decrease in visibility with respect to the retroreflective objects 81 while suppressing glare to the human 82.

In the above-described embodiment, it has been described as an example that the image generation unit 20 generates an ADB light distribution image by preforming processing on the high beam image read from the memory ME. However, the method of generating an ADB light distribution image by the image generation unit 20 is not limited. For example, the image generation unit 20 may generate an ADB light distribution image by generating an image of a region corresponding to the first region in the high beam image and an image of a region corresponding to the second region in the high beam image based on the information from the detection device 120, and combining the generated images with the high beam image. In addition, a plurality of images to be regions corresponding to the first regions in the high beam image, or these images and a plurality of images to be regions corresponding to the second regions may be stored in the memory ME in advance. In this case, the image generation unit 20 may generate an ADB light distribution image by selecting a specific image from among these images based on the information from the detection device 120, and combine the selected image with the high beam image. Furthermore, the method of combining images is not limited, and for example, images may be combined together using a layer function.

In the first embodiment, it has been described as an example that the control unit CO includes an image generation unit 20 and controls the light unit 10 based on an ADB image generated by the image generation unit 20. However, the control unit CO does not need to include the image generation unit 20. In this case, for example, information regarding an ADB light distribution pattern according to an object is stored in the memory ME in advance. This information may be information regarding the amount of light emitted from each of the light emitting elements 13 such that light emitted from the light source unit 12 is light having an ADB light distribution pattern according to an object. Then, the control unit CO refers to the information stored in the memory ME based on the information of the object input from the detection device 120, and controls the light unit 10 based on the information.

In addition, in the first embodiment, it has been described as an example that the light source unit 12 includes a plurality of light emitting elements 13 capable of individually changing the amount of light emitted therefrom. However, the light source unit 12 is not limited. For example, the light source unit 12 may include a digital mirror device (DMD) including a plurality of reflective elements arranged in a matrix and a light emitting unit that irradiates the DMD with light. The DMD can adjust the amount of light emitted in a predetermined direction from a reflective surface of each of the reflective elements, such that the light emitted in the predetermined direction from each of the reflective elements can be light based on the image generated by the image generation unit 20. In this case, it can be understood that the reflective surface of each of the reflective elements corresponds to a light emitting unit capable of individually changing the amount of light to be emitted.

In addition, in the first embodiment, it has been described as an example that the vehicle 100 includes a pair of vehicle headlights 1 each including a control unit CO and a memory ME. However, at least one of the control unit CO and the memory ME may be shared by the pair of vehicle headlights 1. In addition, a signal output from the detection device 120 may be input to the control unit CO without passing through the ECU 101. In addition, the vehicle in which the vehicle headlights 1 are provided, the number of vehicle headlights 1 provided in the vehicle, and the like are not particularly limited.

Second Embodiment

Next, a second embodiment will be described as a second aspect of the present invention. Note that the components that are identical or equivalent to those in the first embodiment will be denoted by the same reference numerals, and redundant description will be omitted unless otherwise specified.

In the present embodiment, the images stored in the memory ME are a low beam image and a high beam image. The low beam image is an image for causing light emitted from the light source unit 12 to form a low beam light distribution pattern, and the high beam image is an image for causing light emitted from the light source unit 12 to form a high beam light distribution pattern. By performing processing on the high beam image based on information indicated by the signal input from the detection device 120, the image generation unit 20 of the present embodiment generates an ADB light distribution image indicating an ADB light distribution pattern in which the amount of light in some regions of the high beam light distribution pattern is decreased and the amount of light in other regions of the high beam light distribution pattern is increased.

The light distribution control unit 40 of the present embodiment controls the light unit 10 by controlling the power supply circuit 50 based on information of the low beam image, information of the high beam image, and information of the ADB light distribution image. As described above, the image generation unit 20 generates an image based on information indicated by the signal input from the detection device 120. Therefore, it can be understood that the control unit CO receives a signal the detection device 120 and controls the light unit 10 using the image generation unit 20 and the light distribution control unit 40.

Note that the predetermined objects detected by the detection device 120, the number of types of predetermined objects, and the configuration of the detection device 120 are not particularly limited. For example, the image acquisition unit 121 may be a CCD camera and a LiDAR, and in this case, the detection unit 122 detects predetermined objects based on images acquired by the CCD camera and the LiDAR. In addition, the method of detecting a predetermined object by the detection unit 122 is not limited. For example, when information of an image in which a pair of white light spots or a pair of red light spots having a luminance higher than a predetermined luminance are present at a predetermined distance in the left-right direction is input from the image acquisition unit 121, the detection unit 122 detects presence of another vehicle as a predetermined object and a position of the presence from the light spots. For example, when information of an image in which a pair of white light spots are present is input from the image acquisition unit 121, the detection unit 122 identifies another vehicle as an oncoming vehicle. In addition, when information of an image in which a pair of red light spots are present is input from the image acquisition unit 121, the detection unit 122 identifies another vehicle as a preceding vehicle. For example, the pair of white light spots are headlights of the oncoming vehicle, and the pair of red light spots are taillights of the preceding vehicle.

Next, the operation of the vehicle headlight 1 of the present embodiment will be described. In the present embodiment, the operations of the pair of vehicle headlights 1 are the same and synchronized with each other. Therefore, hereinafter, the operation of one vehicle headlight 1 will be described, and the description of the operation of the other vehicle headlight 1 will be omitted.

FIG. 8 is a flowchart of control performed by the control unit CO in the present embodiment. As illustrated in FIG. 8, the control flow includes steps SP21 to SP29. In the start state illustrated in FIG. 8, it is assumed that a signal is input from the detection device 120 to the control unit CO. In addition, since steps SP21 to SP25 in the present embodiment are similar to steps SP21 to SP25 in the first embodiment, the description thereof will be omitted.

(Step SP26)

In this step, the control unit CO controls the light unit 10 to emit a high beam from the vehicle headlight 1. Specifically, the image generation unit 20 reads the high beam image stored in the memory ME, and the light distribution control unit 40 controls the power supply circuit 50 based on the information of the high beam image to supply power to each of the light emitting elements 13 of the light source unit 12. By supplying the power in this manner, the light source unit 12 emits light based on the high beam image, and light having a high beam light distribution pattern is emitted from the vehicle headlight 1. In this way, when another vehicle is not located in front of the vehicle 100, a high beam is emitted from the vehicle headlight 1.

Figure 9:
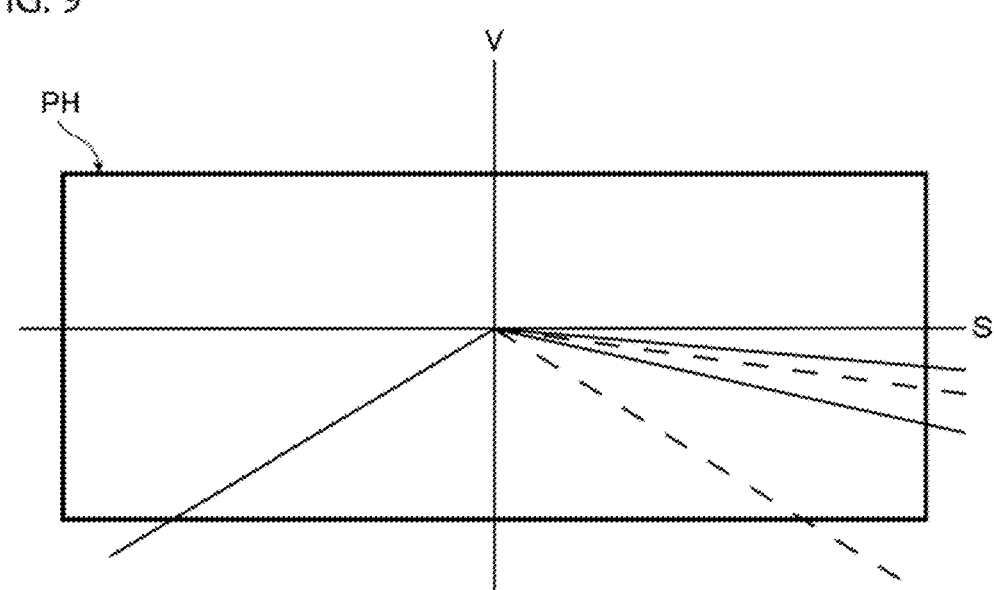
FIG. 9 is a diagram illustrating an example of a high beam light distribution pattern.

FIG. 9 is a diagram illustrating an example of a high beam light distribution pattern in the present embodiment, similarly to FIG. 5. The state illustrated in FIG. 9 is a state in which the vehicle 100 travels in a lane on the shoulder side of a two-lane road on each side. In the present embodiment, when a high beam is emitted, light is emitted from all the light emitting elements 13, and the external shape of the high beam light distribution pattern is generally a horizontally-long rectangular shape. Once the high beam is emitted from the vehicle headlight 1, the control unit CO returns the control flow to step SP21.

(Step SP27)

In this step, the control unit CO advances the control flow to step SP28 when a signal indicating that one predetermined object is present is input from the detection device 120, and advances the control flow to step SP29 when a signal indicating that a plurality of predetermined objects is present is input from the detection device 120.

(Step SP28)

In this step, the control unit CO controls the light unit 10 such that the light distribution pattern of light emitted from the vehicle headlight 1 becomes an ADB light distribution pattern corresponding to one predetermined object located in front of the vehicle 100 and detected by the detection device 120. The ADB light distribution pattern in the present embodiment is a light distribution pattern in which the amount of light is changed in a first region overlapping at least a part of the predetermined object and a second region surrounding the first region of the high beam light distribution pattern PH. The change in amount of light in the first region is a decrease as compared with a case where no predetermined object is located in front of the vehicle 100. The change in amount of light in the second region is an increase as compared with a case where no predetermined object is located in front of the vehicle 100. That is, the control unit CO controls the light unit 10 such that the amount of light in the first region decreases and the amount of light in the second region increases in the high beam light distribution pattern PH as compared with those in a case where no predetermined object is located in front of the vehicle 100.

Figure 10:
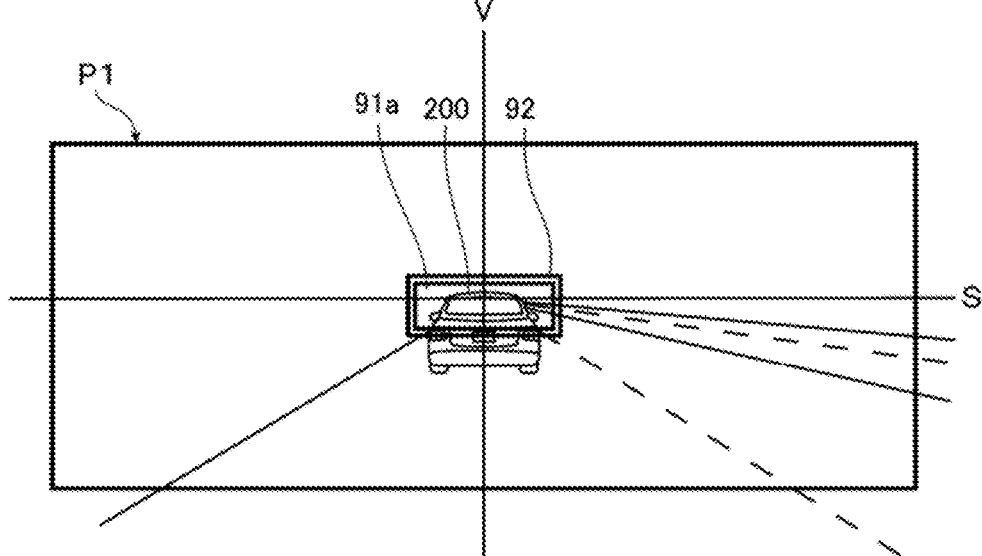
FIG. 10 is a diagram illustrating an example of an ADB light distribution pattern in the second embodiment, similarly to FIG. 9.

FIG. 10 is a diagram illustrating an example of an ADB light distribution pattern in the present embodiment, similarly to FIG. 9, and is a diagram illustrating an ADB light distribution pattern when another vehicle 200 as a predetermined object is located in front of the vehicle 100. In FIG. 10, the another vehicle 200 is a preceding vehicle traveling in a lane that is the same as the lane in which the vehicle 100 travels of a two-lane road on each side. The amount of light in the first region 91*a* overlapping at least a part of the another vehicle 200 of the ADB light distribution pattern P1 is smaller than the amount of light in the first region 91*a* of the high beam light distribution pattern PH. Therefore, according to the vehicle headlight 1 of the present embodiment, it is possible to reduce the amount of light irradiated to the another vehicle 200, suppressing glare to a driver of the another vehicle 200. Note that the first region 91*a* of the present embodiment is a light shielding region that is not irradiated with light, but is not limited thereto. In the example illustrated in FIG. 10, the first region 91*a* has a rectangular shape overlapping a portion above the license plate of the another vehicle 200. However, from the viewpoint of suppressing glare to the driver of the another vehicle 200, it is only required that the first region 91*a* overlap at least a part of a visible portion for the driver of the another vehicle 200 to view the outside of the vehicle. For example, the first region 91*a* may overlap the whole of the another vehicle 200, and the shape and size of the first region 91*a* are not limited. Note that the visible portion is, for example, a front window in a case where the another vehicle 200 is an oncoming vehicle, and is, for example, a side mirror, a rear window, an imaging device that images an area behind the vehicle, or the like in a case where the another vehicle 200 is a preceding vehicle, and the visible portion generally tends to be disposed above the license plate.

The second region 92 is a region surrounding the first region 91*a*, and the amount of light in the second region 92 is larger than the amount of light in the second region 92 of the high beam light distribution pattern PH. Therefore, according to the vehicle headlight 1 of the present embodiment, it is possible to suppress the periphery of the darkened first region 91*a* from appearing dark, suppressing a decrease in visibility ahead of the vehicle 100. In the present embodiment, the second region 92 follows the whole of the outer edge of the first region 91*a* and surrounds the whole of the first region 91*a*, but it is only required that the second region 92 surround at least a part of the first region 91*a*. However, from the viewpoint of suppressing the periphery of the first region 91*a* from appearing dark, it is preferable to surround half or more of the first region 91*a*, and it is more preferable to surround the whole of the first region 91*a*. In the present embodiment, the width of the second region 92 is generally constant, but does not need to be constant. In the present embodiment, the amount of light that decreases in the first region 91*a* is equal to the amount of light that increases in the second region 92. Note that the amount of light that decreases in the first region 91*a* may be different from the amount of light that increases in the second region 92. Further, in the present embodiment, the light increase rate is constant over the entire second region 92. The light increase rate is a rate (%) at which the amount of light increases with respect to the amount of light in a case where no predetermined object is located in front of the vehicle 100. For example, in a case where the amount of light before the light is increased is 100 and the amount of light after the light is increased is 120, the light increase rate is 20%. Note that the light increase rate does not need to be constant in the entire second region 92, and for example, the light increase amount per unit area may be constant in the entire second region 92.

In order to control light to have such an ADB light distribution pattern, in the present embodiment, the image generation unit 20 first reads the high beam image stored in the memory ME. Next, the image generation unit 20 generates an ADB light distribution image indicating an ADB light distribution pattern P1 by performing processing on the high beam image based on information regarding a predetermined object input from the detection device 120. The processing of the image generation unit 20 is processing in which a region corresponding to the first region 91*a* in the high beam image becomes dark and a region corresponding to the second region 92 in the high beam image becomes bright. By processing the high beam image in this manner, the image generation unit 20 generates an ADB light distribution image. Next, based on the information of the generated ADB light distribution image, the light distribution control unit 40 controls the power supply circuit 50 to emit light based on the ADB light distribution image from the light source unit 12. As a result, light having the ADB light distribution pattern P1 is emitted from the vehicle headlight 1. Then, the control unit CO returns the control flow to step SP21.

(Step SP29)

In this step, the control unit CO controls the light unit 10 such that the light distribution pattern of light emitted from the vehicle headlight 1 becomes an ADB light distribution pattern corresponding to a plurality of predetermined objects located in front of the vehicle 100 and detected by the detection device 120. In the ADB light distribution pattern in this case, a first region is provided for each of the predetermined objects, and one second region is provided. The second region surrounds the plurality of first regions and includes at least a part of a region between adjacent ones of the first regions. That is, the control unit CO controls the light unit such that the amount of light in the plurality of first regions corresponding to the respective predetermined objects decreases and the amount of light in the second region surrounding the plurality of first regions and including at least a part of the region between adjacent ones of the first regions increases in the high beam light distribution pattern PH.

Figure 11:
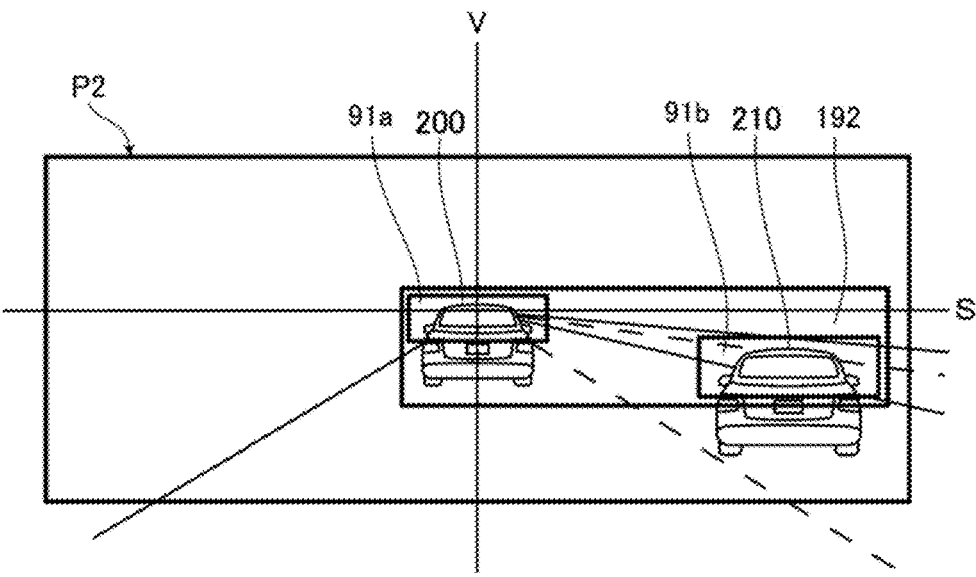
FIG. 11 is a diagram illustrating another example of an ADB light distribution pattern in the second embodiment, similarly to FIG. 10.

FIG. 11 is a diagram illustrating another example of an ADB light distribution pattern in the present embodiment, similarly to FIG. 10, and is a diagram illustrating an ADB light distribution pattern when the another vehicle 200 illustrated in FIG. 10 and another vehicle 210 as another predetermined object are located in front of the vehicle 100. In FIG. 11, the another vehicle 210 is a preceding vehicle traveling in a lane that is different from the lane in which the vehicle 100 travels of a two-line road on each side. A first region 91*a* in the ADB light distribution pattern P2 illustrated in FIG. 7 is the same as the first region 91*a* in the ADB light distribution pattern P1 illustrated in FIG. 10. The amount of light in another first region 91*b* overlapping at least a part of the another vehicle 210 of the ADB light distribution pattern P2 illustrated in FIG. 11 is smaller than the amount of light in the first region 91*a* of the high beam light distribution pattern PH. The first region 91*b* of the present embodiment is a light shielding region similarly to the first region 91*a*, but is not limited thereto.

In addition, a second region 192 surrounds the first region 91*a* and the first region 91*b* and includes at least a part of a region between the first region 91*a* and the first region 91*b*, and the amount of light in the second region 192 is larger than the amount of light in the second region 192 in the high beam light distribution pattern PH. Therefore, according to the vehicle headlight 1 of the present embodiment, it is possible to suppress the periphery of each of the darkened first regions 91*a* and 91*b* and the region between the first region 91*a* and the first region 91*b* from appearing dark, suppressing a decrease in visibility ahead of the vehicle. In the present embodiment, the second region 192 surrounds the whole of each of the first regions 91*a* and 91*b*, but it is only required that the second region 192 surround at least a part of each of the first regions 91*a* and 91*b*. However, from the viewpoint of suppressing the periphery of each of the first regions 91*a* and 91*b* from appearing dark, the second region 192 preferably surrounds half or more of each of the first regions 91*a* and 91*b*, and more preferably surrounds the whole of each of the first regions 91*a* and 91*b*. In the present embodiment, the external shape of the second region 192 is a minimum rectangular shape in which the minimum distance between the outer edge of the second region 192 and the first region 91*b* is equal to the width of the second region 92 illustrated in FIG. 10. Therefore, the second region 192 includes the second region 92 illustrated in FIG. 10, and a part of the outer edge of the second region 192 coincides with a part of the outer edge of the second region 92 illustrated in FIG. 10. Note that the shape and size of the second region 192 are not limited.

In the present embodiment, the total amount of light that decreases in the first regions 91*a* and 91*b* is equal to the amount of light that increases in the second region 192. Note that the total amount of light that decreases in the first regions 91*a* and 91*b* may be different from the amount of light that increases in the second region 192. Furthermore, in the present embodiment, the light increase rate is constant in the entire second region 192, but the light increase rate does not need to be constant in the entire second region 192, and for example, the light increase amount per unit area may be constant in the entire second region 192.

In order to control the ADB light distribution pattern in this manner, similarly to step SP28, the image generation unit 20 generates an ADB light distribution image indicating an ADB light distribution pattern P2 by performing processing on the high beam image based on information regarding a plurality of predetermined objects input from the detection device 120. Next, based on the information of the generated ADB light distribution image, the light distribution control unit 40 controls the power supply circuit 50 to emit light based on the ADB light distribution image from the light source unit 12. As a result, light having the ADB light distribution pattern P2 is emitted from the vehicle headlight 1. Then, the control unit CO returns the control flow to step SP21.

As described above, the ADB light distribution pattern changes depending on the relative position of the predetermined object with respect to the vehicle 100, and also changes depending on the number of predetermined objects.

Next, a change in ADB light distribution pattern will be described. First, a change in ADB light distribution pattern in a case where the first state in which one predetermined object is located in front of the vehicle 100 is changed to the second state in which another predetermined object is located in front of the vehicle 100 in addition to the predetermined object will be described. Hereinafter, a case where the ADB light distribution pattern P1 illustrated in FIG. 10 is changed to the ADB light distribution pattern P2 illustrated in FIG. 11 will be described as an example.

Figure 12:
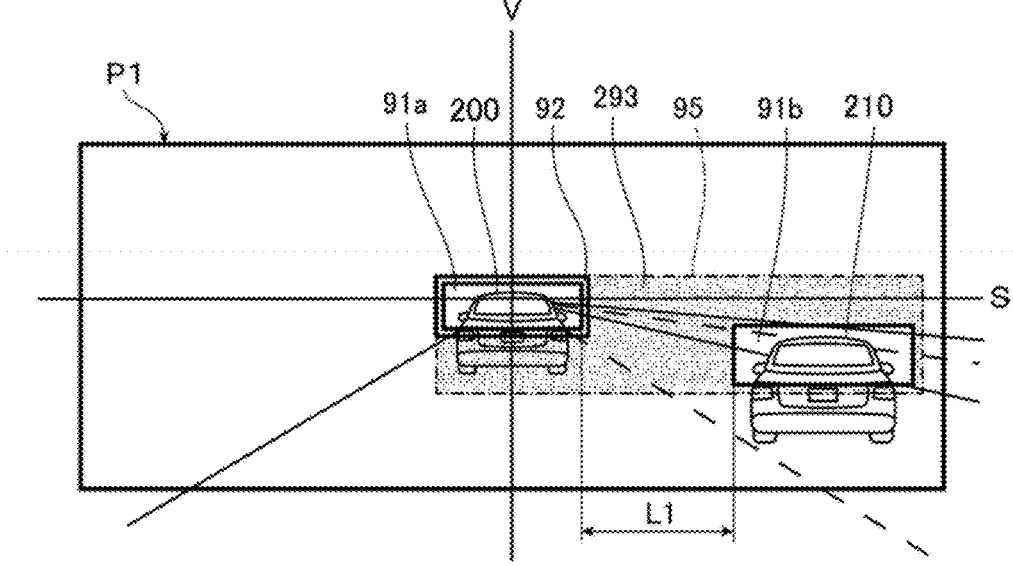
FIG. 12 is a diagram for explaining an example of how the ADB light distribution pattern changes in the second embodiment.

FIG. 12 is a diagram for explaining an example of how the ADB light distribution pattern changes in the second embodiment. Note that the state illustrated in FIG. 12 is a state in which the another vehicle 210 as another predetermined object is located in front of the vehicle 100 in the state illustrated in FIG. 10. In this case, the control unit CO first controls the light unit 10 such that the amount of light in the another first region 91b overlapping at least a part of the another vehicle 210 of the ADB light distribution pattern P1 becomes smaller than the amount of light in the first region 91a of the high beam light distribution pattern PH. That is, the control unit CO controls the light unit 10 such that the amount of light in the first regions 91a and 91b decreases and the amount of light in the second region 92 increases in the high beam light distribution pattern PH.

Next, the control unit CO controls the light unit 10 such that the amount of light in a specific region 293 of the ADB light distribution pattern P1 increases over time to a predetermined amount. The specific region 293 is a region other than the first region 91a, the first region 91b, and the second region 92 inside a frame 95 surrounding the first region 91a, the first region 91b, and at least a part of the region between the first region 91a and the first region 91b. That is, the control unit CO controls the light unit 10 such that the first region 91a, the first region 91b, and the second region 92 are formed in the high beam light distribution pattern PH, and the amount of light in the specific region 293 of the high beam light distribution pattern PH increases over time to the predetermined amount. In FIG. 12, the frame 95 is indicated by an alternate long and short dash line. As the amount of light in the specific region 293 increases to the predetermined amount, a continuous region constituted by the second region 92 and the specific region 293 surrounds the first regions 91a and 91b and includes at least a part of the region between the first region 91a and the first region 91b. Then, this region becomes the second region 192 of the ADB light distribution pattern P2 illustrated in FIG. 11, and the ADB light distribution pattern P1 changes to the ADB light distribution pattern P2.

In the present embodiment, the shape of the frame 95 is a minimum rectangular shape in which the minimum distance between the frame 95 and each of the first regions 91a and 91b surrounded by the frame 95 is equal to or larger than a predetermined distance, and the predetermined distance is equal to the width of the second region 92 in the ADB light distribution pattern P1 illustrated in FIG. 10. Therefore, a part of the frame 95 coincides with a part of the outer edge of the second region 92, and the frame 95 surrounds the second region 92. Note that the frame 95 only needs to surround the first region 91a, the first region 91b, and at least a part of the region between the first region 91a and the first region 91b, and the shape and size of the frame 95 are not limited. The shape of the second region 192 changes depending on the shape of the frame 95.

Figure 13:
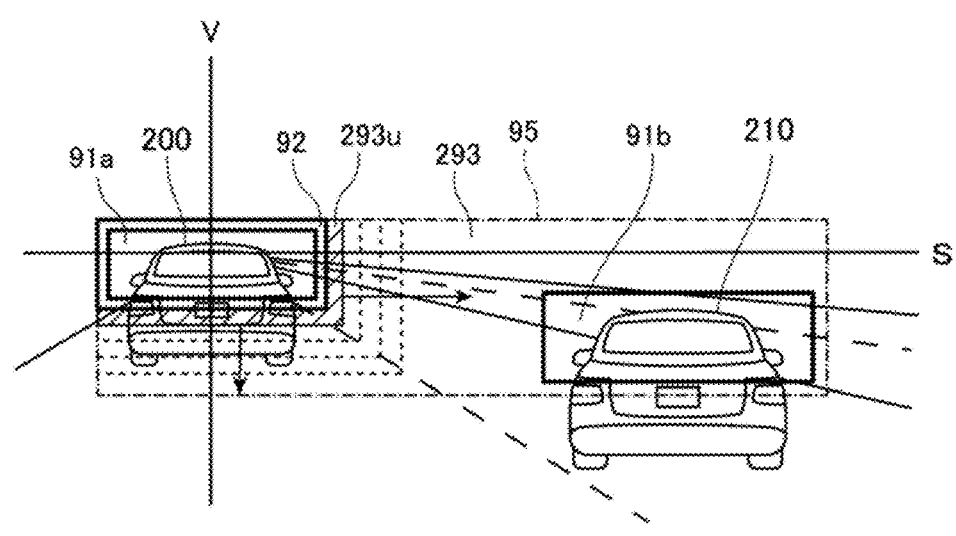
FIG. 13 is a diagram for explaining an example of how an amount of light in a specific region increases.

In addition, in the present embodiment, as illustrated in FIG. 13, the control unit CO controls the light unit 10 such that a region 293u where the amount of light increases of the specific region 293 spreads over time from the second region 92 side toward the first region 91b side. Therefore, according to the vehicle headlight 1 of the present embodiment, it is possible to make the second region 92, which is a light-increased region, to appear spreading toward the first region 91b side. FIG. 13 is a diagram for explaining an example of how the amount of light in the specific region 293 increases. Note that, in FIG. 13, for easy understanding, the region 293u is hatched with oblique lines, and an arrow indicating a direction in which the region 293u spreads is shown.

In the present embodiment, the control unit CO controls the light unit 10 such that the light increase rate in the region 293u where the amount of light increases of the specific region 293 based on a case where no predetermined object is located in front of the vehicle 100 is equal to the light increase rate in the second region 92 based on the case, during a period in which the amount of light increases in the specific region 293. Therefore, according to the vehicle headlight 1 of the present embodiment, it is possible to make it difficult for the driver to visually recognize a boundary between the second region 92 and the region 293u where the amount of light increases of the specific region 293 during the period in which the amount of light increases in the specific region 293. In addition, in a state where the amount of light in the specific region 293 has increased to the predetermined amount, the light increase rate in the specific region 293 is equal to the light increase rate in the second region 92. As described above, the total amount of light that decreases in first region 91a and first region 91b is equal to the total amount of light that increases in the second region 92 and the specific region 293. Therefore, the light increase rate in the second region 92 when the amount of light in the specific region 293 reaches the predetermined amount is lower than the light increase rate in the second region 92 when the amount of light in the specific region 293 starts to increase, and the light increase rate in the second region 92 decreases over time during a period in which the amount of light in the specific region 293 increases.

During the period in which the amount of light in the specific region 293 increases, the light increase rate in the second region 92 and the light increase rate in the region 293u may be different from each other. In addition, in a state where the amount of light in the specific region 293 has increased to the predetermined amount, the light increase rate in the second region 92 and the light increase rate in the specific region 293 may be different from each other.

In addition, in the present embodiment, the control unit CO controls the light unit 10 such that the total amount of light that decreases in the first region 91a and the first region 91b is equal to the total amount of light that increases in the second region 92 and the specific region 293. Therefore, according to the vehicle headlight 1 of the present embodiment, it is possible to suppress an increase in energy consumption as compared with that in a case where the total amount of light that increases in the second region 92 and the specific region 293 is larger than the total amount of light that decreases in the first region 91a and the first region 91b. Note that the total amount of light that decreases in the first region 91a and the first region 91b and the total amount of light that increases in the second region 92 and the specific region 293 may be different from each other.

Furthermore, in the present embodiment, the control unit CO controls the light unit 10 such that, as the specific region 293 has a larger area, the period until the amount of light in the specific region 293 reaches the predetermined amount is longer.

In order to control the change in ADB light distribution pattern in this manner, in the present embodiment, the image generation unit 20 generates a plurality of ADB light distribution images indicating the process of changing the ADB light distribution pattern based on information regarding the another vehicle 200 and the another vehicle 210 input from the detection device 120. Next, based on the information of these ADB light distribution images, the light distribution control unit 40 controls the power supply circuit 50 to emit light from the light source unit 12.

Next, a change in ADB light distribution pattern in a case where a state in which a plurality of predetermined objects is located in front of the vehicle 100 is changed to a state in which other predetermined object are located in front of the vehicle 100 in addition to those predetermined objects will be described. Hereinafter, a change in ADB light distribution pattern in a case where a plurality of other predetermined objects are further located in front of the vehicle 100 in a state where the ADB light distribution pattern P2 illustrated in FIG. 11 is emitted will be described.

Figure 14:
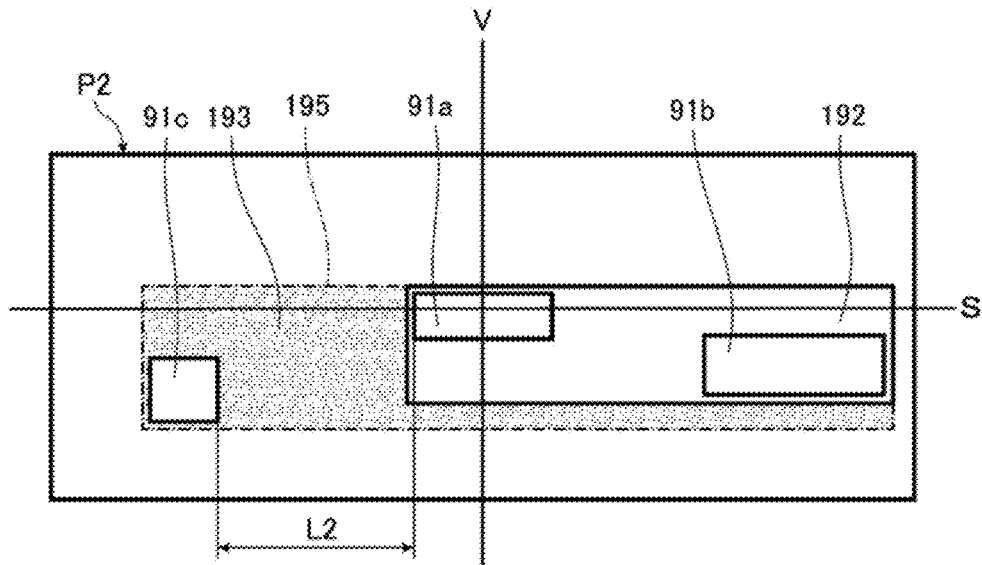
FIG. 14 is a diagram for explaining another example of how the ADB light distribution pattern changes in the second embodiment.

FIG. 14 is a diagram for explaining another example of how the ADB light distribution pattern changes in the second embodiment. The state illustrated in FIG. 14 is a state in which another predetermined object is located in front of the vehicle 100 in the state illustrated in FIG. 11. In this case, the control unit CO first controls the light unit 10 such that the amount of light in another first region 91c overlapping at least a part of another predetermined object of the ADB light distribution pattern P2 becomes smaller than the amount of light in the first region 91c of the high beam light distribution pattern PH. That is, the control unit CO controls the light unit 10 such that the amount of light in the first regions 91a, 91b, and 91c decreases and the amount of light in the second region 192 increases in the high beam light distribution pattern PH.

Next, the control unit CO controls the light unit 10 such that the amount of light in a specific region 193 of the ADB light distribution pattern P2 increases over time to a predetermined amount. The specific region 193 is a region other than the first regions 91a, 91b, and 91c, and the second region 192 inside a frame 195 surrounding the first regions 91a, 91b, and 91c and at least a part of a region between adjacent ones of the first regions 91a, 91b, and 91c. That is, the control unit CO controls the light unit 10 such that the first regions 91a, 91b, and 91c and the second region 192 are formed in the high beam light distribution pattern PH, and the amount of light in the specific region 193 of the high beam light distribution pattern PH increases over time to the predetermined amount. In FIG. 14, the frame 195 is indicated by an alternate long and short dash line.

Similarly to the shape of the frame 95, the shape of the frame 195 of the present embodiment is a minimum rectangular shape in which the minimum distance between the frame 195 and each of the first regions 91a, 91b, and 91c surrounded by the frame 195 is equal to or larger than a predetermined distance, and the predetermined distance is equal to the predetermined distance in the frame 95. Therefore, a part of the frame 195 coincides with a part of the outer edge of the second region 192, and the frame 195 surrounds the second region 192. Note that the shape and size of the frame 195 are not limited.

As the amount of light in the specific region 193 increases to the predetermined amount, a continuous region constituted by the second region 192 and the specific region 193 surrounds the first regions 91a, 91b, and 91c and includes at least a part of the region between adjacent ones of the first regions 91a, 91b, and 91c. Then, the region constituted by the second region 192 and the specific region 193 becomes a new second region 192, and the ADB light distribution pattern P2 illustrated in FIG. 7 changes to an ADB light distribution pattern corresponding to the another vehicle 200, the another vehicle 210, and the another predetermined object.

Although illustration is omitted, in the present embodiment, similarly to the case illustrated in FIG. 13, the control unit CO controls the light unit 10 such that a region where the amount of light increases of the specific region 293 spreads over time from the second region 192 side toward the first region 91c side. Therefore, according to the vehicle headlight 1 of the present embodiment, it is possible to make the second region 192 to appear spreading toward the first region 91c side.

In the present embodiment, the light unit 10 is controlled such that, during a period in which the amount of light increases in the specific region 193, the light increase rate in the region where the amount of light increases of the specific region 193 is identical to the light increase rate in the second region 192. Therefore, according to the vehicle headlight 1 of the present embodiment, it is possible to make it difficult for the driver to visually recognize a boundary between the second region 192 and the region where the amount of light increases of the specific region 193 during the period in which the amount of light increases in the specific region 193. In addition, in a state where the amount of light in the specific region 193 has increased to the predetermined amount, the light increase rate in the specific region 193 is equal to the light increase rate in the second region 192. During the period in which the amount of light in the specific region 193 increases, the light increase rate in the second region 192 and the light increase rate in the region where the amount of light increases of the specific region 193 is increased may be different from each other. In addition, in a state where the amount of light in the specific region 193 has increased to the predetermined amount, the light increase rate in the second region 192 and the light increase rate in the specific region 193 may be different from each other.

In addition, in the present embodiment, the control unit CO controls the light unit 10 such that the total amount of light that decreases in the first regions 91a, 91b, and 91c is equal to the total amount of light that increases in the second region 192 and the specific region 193. Therefore, according to the vehicle headlight 1 of the present embodiment, it is possible to suppress an increase in energy consumption as compared with that in a case where the total amount of light that increases in the second region 192 and the specific region 193 is larger than the total amount of light that decreases in the first regions 91a, 91b, and 91c. Note that the total amount of light that decreases in the first regions 91a, 91b, and 91c and the total amount of light that increases in the second region 192 and the specific region 193 may be different from each other.

Furthermore, in the present embodiment, the control unit CO controls the light unit 10 such that, as the specific region 193 has a larger area, the period until the amount of light in the specific region 193 reaches the predetermined amount is longer.

In this way, in the vehicle headlight 1 of the present embodiment, when the emission of the high beam is selected by the light switch 110, the light distribution pattern of the emitted light changes according to the predetermined object located in front of the vehicle 100.

Note that the change in ADB light distribution pattern when the number of first regions decreases is not limited. For example, when the ADB light distribution pattern P2 illustrated in FIG. 7 is changed to the ADB light distribution pattern P1 illustrated in FIG. 6, the amount of light in the first region 91b increases and returns to the amount of light in the first region 91b of the high beam light distribution pattern PH. In addition, the amount of light in the specific region 293 of the ADB light distribution pattern P2 decreases over time and returns to the amount of light in the specific region 293 of the high beam light distribution pattern PH. That is, the control unit CO may control the light unit 10 in this manner.

By the way, in a case where a region having a reduced amount of light is formed as in the vehicle headlight of Patent Literature 1 described above, the driver of the host vehicle tends to feel dark not only in the region but also around the region, which may decrease visibility ahead of the vehicle. In the vehicle headlight of Patent Literature 1, when a plurality of other vehicles are located in front of the vehicle, the amount of light decreases in one region including regions overlapping those other vehicles. For this reason, a region between adjacent ones of the other vehicles also becomes dark, which decreases visibility ahead of the vehicle. There is a demand for suppressing such a decrease in visibility ahead of the vehicle. In response to this demand, for example, it may be considered to increase the amount of light emitted to the periphery of the region where the amount of light has decreased and the region between adjacent ones of the other vehicles. However, in such light distribution control, when the amount of light increases in some regions, the driver of the host vehicle may feel uncomfortable about the increase.

Therefore, in the vehicle headlight 1 of the present embodiment, in the first state in which another vehicle 200 as a predetermined object is located in front of the vehicle 100, the control unit CO controls the light unit 10 such that the amount of light in the first region 91a overlapping at least a part of the another vehicle 200 decreases and the amount of light in the second region 92 surrounding the first region 91a increases in the high beam light distribution pattern PH as compared with those in a case where the another vehicle 200 is not located in front of the vehicle 100. In addition, when the first state is changed to the second state in which the another vehicle 200 and another vehicle 210 as another predetermined object are located in front of the vehicle 100, the light unit 10 is controlled such that the amount of light in another first region 91b overlapping at least a part of the another vehicle 210 of the high beam light distribution pattern PH decreases and the amount of light in the specific region 293 increases over time to a predetermined amount. The specific region 293 is a region other than the first region 91a, the another first region 91b, and the second region 92 surrounding the first region 91a, the another first region 91b, and at least a part of the region between the first region 91a and the another first region 91b. Therefore, according to the vehicle headlight 1 of the present embodiment, it is possible to suppress the periphery of each of the first region 91a and the another first region 91b, which are regions to be darkened, and the region between the first region 91a and the another first region 91b from appearing dark, suppressing a decrease in visibility ahead of the vehicle 100. In addition, according to the vehicle headlight 1 of the present embodiment, it is possible to suppress the driver of the vehicle 100 from feeling uncomfortable as compared with a case where the amount of light in the specific region 293 instantaneously reaches the predetermined amount. Therefore, according to the vehicle headlight 1 of the present embodiment, when the amount of light in the region overlapping at least a part of the predetermined object decreases, it is possible to suppress a decrease in visibility while suppressing the driver from feeling uncomfortable.

In addition, in the vehicle headlight 1 of the present embodiment, the control unit CO controls the light unit 10 such that, in a state where the amount of light in the specific region 293 has become a predetermined amount, the light increase rate in the specific region 293 based on a case where no predetermined object is located in front of the vehicle 100 is equal to the light increase rate in the second region 92 based on the case. Therefore, according to the vehicle headlight 1 of the present embodiment, it is possible to make it difficult for the driver to visually recognize a boundary between the second region 92 and the specific region 293 in a state where the amount of light in the specific region 293 has reached the predetermined amount.

In the vehicle headlight 1 of the present embodiment, the frame 95 has a rectangular shape. Therefore, according to the vehicle headlight 1 of the present embodiment, for example, it is possible to reduce the control load of the control unit CO as compared with that in a case where the frame 95 is circular.

In addition, in the vehicle headlight 1 of the present embodiment, the control unit CO controls the light unit 10 such that, as the specific region 293 has a larger area, the period until the amount of light in the specific region 293 reaches the predetermined amount is longer. The larger the area of the region where the amount of light changes, the more likely the driver is to feel uncomfortable about the change in amount of light. Therefore, according to the vehicle headlight 1 of the present embodiment, it is possible to suppress the driver from feeling uncomfortable about the increase in amount of light in the specific region 293.

In the present embodiment, it has been described as an example that each of the first regions 91a and 91b overlap at least a part of each of the other vehicles 200 and 210 as a predetermined object. However, for example, in a case where the first region overlaps at least a part of a retroreflective object as a predetermined object, the amount of light irradiated to the retroreflective object is decreased. Therefore, the amount of reflected light reflected by the retroreflective object and directed to the host vehicle is decreased, making it possible to suppress glare to the driver of the host vehicle caused by the reflected light. In addition, in a case where the first region overlaps at least a part of a human as a predetermined object, the amount of light irradiated to the human is decreased, making it possible to suppress glare to the human. In this case, the first region preferably overlaps only the human head.

Third Embodiment

Next, a third embodiment will be described in detail as a second aspect of the present invention. Note that the components that are identical or equivalent to those in the second embodiment will be denoted by the same reference numerals, and redundant description will be omitted unless otherwise specified.

Figure 15:
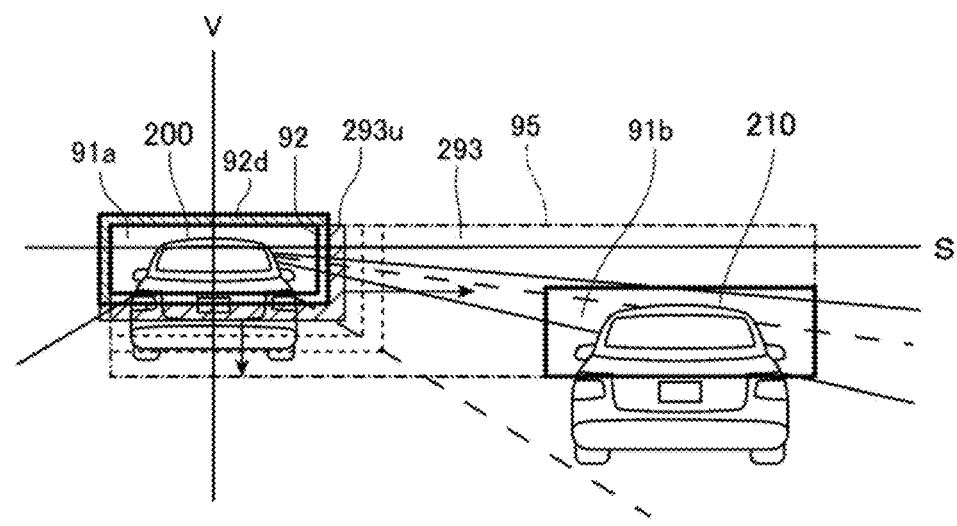
FIG. 15 is a diagram for explaining a specific region and an example of how an amount of light in the specific region increases in a third embodiment as a second aspect.

In the present embodiment, a specific region 293 in a case where the number of predetermined objects changes from one to two is different from the specific region 293 in the first embodiment. FIG. 15 is a diagram for explaining the specific region 293 and an example of how the amount of light in the specific region 293 increases in the present embodiment. Note that, similarly to the state illustrated in FIG. 9, the state illustrated in FIG. 15 is a state in which, while another vehicle 200 is located in front of the vehicle 100, another vehicle 210 is further located in front of the vehicle 100.

As illustrated in FIG. 15, the specific region 293 in the present embodiment is a region other than the first region 91a, the first region 91b, and the second region 92 inside a frame 95 of a minimum rectangular shape surrounding the first region 91a, the first region 91b, and at least a part of the region between the first region 91*a* and the first region 91*b*. Therefore, a part of the second region 92 is located outside the frame 95.

Similarly to the first embodiment, the control unit CO controls the light unit 10 such that the first region 91*a*, the first region 91*b*, and the second region 92 are formed in the high beam light distribution pattern PH, and the amount of light in the specific region 293 of the high beam light distribution pattern PH increases over time to the predetermined amount. In addition, during at least a part of the period in which the amount of light in the specific region 293 increases, the control unit CO controls the light unit 10 such that an amount of light in a region 92*d* located outside the frame 95 of the second region 92 decreases over time and returns to the amount of light when no predetermined object is located in front of the vehicle 100. That is, the amount of light in the region 92*d* returns to the amount of light in the region 92*d* of the high beam light distribution pattern PH. Therefore, according to the vehicle headlight 1 of the present embodiment, it is possible to increase the amount of light in the specific region 293 while suppressing an increase in energy consumption, as compared with those in a case where the amount of light in the region 92*d* located outside the frame 95 of the second region 92 is not returned to the original amount of light. Note that the amount of light in the region 92*d* does not need to be changed. In FIG. 11, for easy understanding, the region 92*d* is hatched with oblique lines different from those for hatching a region 293*u*.

In the present embodiment, the region 293*u* where the amount of light increases of the specific region 293 spreads over time from the second region 92 side toward the first region 91*b* side. In addition, during the period in which the amount of light in the specific region 293 increases, the light increase rate in the region located inside the frame 95 of the second region 92 is equal to the light increase rate in the region 293*u* where the amount of light increases of the specific region 293. Therefore, in a state where the amount of light in the specific region 293 has increased to the predetermined amount, the light increase rate in the specific region 293 is equal to the light increase rate in the region inside the frame 95 of the second region 92. In addition, in a state where the amount of light in the specific region 293 has reached the predetermined amount, the total amount of light that increases in the region inside the frame 95 of the second region 92 and the specific region 293 based on a case where no predetermined object is located in front of the vehicle 100 is equal to the total amount of light that decreases in the first region 91*a* and the first region 91*b* based on the case. That is, the control unit CO controls the light unit 10 in this manner.

Figure 16:
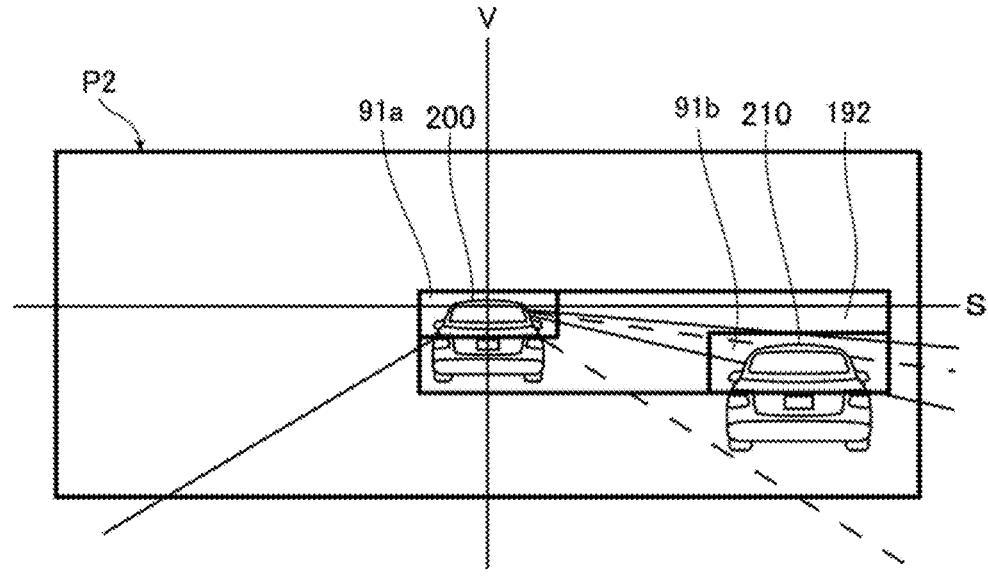
FIG. 16 is a diagram illustrating an example of an ADB light distribution pattern in the third embodiment, similarly to FIG. 10.

In the present embodiment, as the amount of light in the specific region 193 reaches the predetermined amount and the amount of light in the region 92*d* returns to the original amount of light, the ADB light distribution pattern P1 changes to an ADB light distribution pattern corresponding to the another vehicle 200 and the another vehicle 210. FIG. 16 is a diagram illustrating an example of an ADB light distribution pattern P2 in the present embodiment, similarly to FIG. 10. In the ADB light distribution pattern P2, first regions 91*a* and 91*b* are provided, and a second region 192 is provided. The second region 192 in the present embodiment is constituted by the region inside the frame 95 of the second region 92 and the specific region 293, surrounds parts of the first regions 91*a* and 91*b*, and includes at least a part of a region between the first region 91*a* and the first region 91*b*. Therefore, according to the vehicle headlight 1 of the present embodiment, similarly to the first embodiment, it is possible to suppress the periphery of each of the first region 91*a* and the first region 91*b*, and the region between the first region 91*a* and the another first region 91*b* from appearing dark, suppressing a decrease in visibility ahead of the vehicle 100.

Although the second aspect of the present invention has been described by taking the second and third embodiments as examples, the present invention is not limited thereto.

For example, in the second and third embodiments, it has been described as an example that the first regions 91*a* and 91*b* and the second region 92 or 192 are formed in the high beam light distribution pattern PH. However, the light distribution pattern in which the first regions 91*a* and 91*b* and the second region 92 or 192 are formed is not limited, and for example, these regions may be formed in an additional light distribution pattern that is added to a low beam light distribution pattern to form a high beam light distribution pattern. In this case, for example, a low beam is emitted from a light unit different from the light unit 10, and the light unit 10 emits light having an additional light distribution pattern.

Furthermore, in the second and third embodiments, it has been described as an example that the light source unit 12 includes a plurality of light emitting elements 13 capable of individually changing the amount of light emitted therefrom. However, the light source unit 12 is not limited. For example, the light source unit 12 may include a digital mirror device (DMD) including a plurality of reflective elements arranged in a matrix and a light emitting unit that irradiates the DMD with light. The DMD can adjust the amount of light emitted in a predetermined direction from a reflective surface of each of the reflective elements, such that the light emitted in the predetermined direction from each of the reflective elements can be light based on the image generated by the image generation unit 20. In this case, it can be understood that the reflective surface of each of the reflective elements corresponds to a light emitting unit capable of individually changing the amount of light to be emitted.

In the second and third embodiments, it has been described as an example that the control unit CO includes an image generation unit 20 and controls the light unit 10 based on an ADB image generated by the image generation unit 20. However, the control unit CO does not need to include the image generation unit 20. In this case, for example, information regarding an ADB light distribution pattern according to a predetermined object may be stored in the memory ME in advance, and the control unit CO may control the light unit 10 based on the information.

In the second and third embodiments, it has been described as an example that the control unit CO controls the light unit 10 such that the region 293*u* where the amount of light increases of the specific region 293 spreads over time from the second region 92 side toward the first region 91*b* side, and controls the light unit 10 such that the region where the amount of light increases of the specific region 193 spreads over time from the second region 192 side toward the first region 91*c* side. However, it is only required that the amount of light in the specific region 293 or 193 increases over time to the predetermined amount, and the method of increasing the amount of light in the specific region 293 or 193 is not limited. For example, although illustration is omitted, the control unit CO may control the light unit 10 such that the region where the amount of light increases of the specific region 293 or 193 spreads over time from the first region 91*b* or 91*c* side toward the second region 92 or 192 side. In addition, the control unit CO may control the light unit 10 such that the amount of light increases over time in the entire specific region 293 or 193. Further, the control unit CO may control the light unit 10 such that the region where the amount of light increases of the specific region 293 or 193 spreads over time from both the first region 91*b* or 91*c* side and the second region 92 or 192 side. Furthermore, the speed at which the region where the amount of light increases of the specific region 293 or 193 spreads may be constant or may change.

In the second and third embodiments, it has been described as an example that the control unit CO controls the light unit 10 such that, as the specific region 293 or 193 has a larger area, the period until the amount of light in the specific region 193 reaches the predetermined amount is longer. However, the control of the light unit 10 by the control unit CO is not limited. For example, the control unit CO may control the light unit 10 such that, as the distance L1 between the first region 91*a* and the another first region 91*b* is longer, the period until the amount of light in the specific region 293 reaches the predetermined amount is longer. As the distance L1 between the first region 91*a* and the first region 91*b* is longer, the area of the region between the first region 91*a* and the first region 91*b* in the specific region 293 tends to be larger. Therefore, with such a configuration, it is possible to suppress the driver from feeling uncomfortable about the increase in amount of light in the region between the first region 91*a* and the first region 91*b* of the specific region 293. In addition, the control unit CO may control the light unit 10 such that the longer the distance L2 between the first region 91*a* adjacent to another first region 91*c* among the first regions 91*a* and 91*b* surrounded by the frame 195 and another first region 91*c*, the longer the period until the amount of light in the specific region 193 reaches the predetermined amount. With such a configuration, it is possible to suppress the driver from feeling uncomfortable about the increase in amount of light in the region between the first region 91*a* and the first region 91*c* in the specific region 193.

In addition, in the second and third embodiments, the shape of the frame 95 or 195 is a minimum rectangular shape in which the minimum distance between the frame 95 or 195 and the first region surrounded by the frame 95 or 195 is equal to or larger than a predetermined distance. However, the predetermined distance defining the shape of the frame 95 or 195 may be larger, for example, as the ratio of the sum of the areas of the first regions surrounded by the frame 95 or 195 to the entire area of the high beam light distribution pattern PH is larger. In addition, when the ratio is equal to or higher than a predetermined value, the frame 95 or 195 may coincide with the edge of the high beam light distribution pattern. That is, the control unit CO may control the light unit 10 in this manner. With such a configuration, it is possible to reduce the control load of the control unit. The predetermined distance defining the shape of the frame 195 may be larger as the number of first regions surrounded by the frame 195 is larger. In addition, the frame 195 may coincide with the edge of the high beam light distribution pattern when the number of first regions surrounded by the frame 195 is equal to or larger than a predetermined number. That is, the control unit CO may control the light unit 10 in this manner. With such a configuration, it is possible to reduce the control load of the control unit.

In addition, in the second and third embodiments, it has been described as an example that the vehicle 100 includes a pair of vehicle headlights 1 each including a control unit CO and a memory ME. However, at least one of the control unit CO and the memory ME may be shared by the pair of vehicle headlights 1. In addition, a signal output from the detection device 120 may be input to the control unit CO without passing through the ECU 101 of the vehicle 100. In addition, the vehicle in which the vehicle headlights 1 are provided, the number of vehicle headlights 1 provided in the vehicle, and the like are not particularly limited.

According to a first aspect of the present invention, there is provided a vehicle headlight capable of suppressing a driver of a host vehicle from feeling uncomfortable. According to a second aspect of the present invention, there is provided a vehicle headlight capable of suppressing a decrease in visibility while suppressing a driver of a host vehicle from feeling uncomfortable when an amount of light in a region overlapping at least a part of a predetermined object decreases. These vehicle headlights can be used in the field of vehicle headlights for automobiles and the like.

The invention claimed is:

1. A vehicle headlight comprising:

a light unit configured to change a light distribution pattern of light to be emitted; and a control unit configured to receive a signal from a detection device that detects a predetermined object located in front of a vehicle and control the light unit, wherein, as compared with a case where no predetermined object is located in front of the vehicle, when a plurality of predetermined objects is located in front of the vehicle, the control unit decreases an amount of light in a first region individually overlapping at least a part of each of the predetermined objects of the light distribution pattern, increases an amount of light in a second region following at least a part of an outer edge of each of the first regions, and sets a light increase rate in an overlapping region, in which at least a part of one of two of the second regions and the other of the two second regions overlap each other, to be lower than a sum of a light increase rate in one of the two second regions and a light increase rate in the other of the two second regions.

2. The vehicle headlight according to claim 1, wherein the control unit sets the light increase rate in the overlapping region to an average of the light increase rate in one of the two second regions and the light increase rate in the other of the two second regions.

3. The vehicle headlight according to claim 1, wherein the control unit sets the light increase rate in the overlapping region to be equal to the light increase rate in one of the two second regions or the light increase rate in the other of the two second regions.

4. The vehicle headlight according to claim 1, wherein the control unit sets the light increase rate in the overlapping region to be equal to a higher one of the light increase rate in one of the two second regions and the light increase rate in the other of the two second regions.

5. The vehicle headlight according to claim 1, wherein the control unit sets the light increase rate in the overlapping region to be higher than a lower one of the light increase rate in one of the two second regions and the light increase rate in the other of the two second regions.

6. The vehicle headlight according to claim 1, wherein the control unit sets the light increase rate in the overlapping region to be higher than a higher one of the light increase rate in one of the two second regions and the light increase rate in the other of the two second regions.

7. A vehicle headlight comprising:

a light unit configured to change a light distribution pattern of light to be emitted; and a control unit configured to receive a signal from a detection device that detects a predetermined object located in front of a vehicle and control the light unit, wherein, as compared with a case where no predetermined object is located in front of the vehicle, in a first state in which the predetermined object is located in front of the vehicle, the control unit controls the light unit such that, in the light distribution pattern, an amount of light in a first region overlapping at least a part of the predetermined object decreases, and an amount of light in a second region surrounding the first region increases, and when the first state is changed to a second state in which the predetermined object and another predetermined object are located in front of the vehicle, the control unit controls the light unit such that, in the light distribution pattern, an amount of light in another first region overlapping at least a part of the another predetermined object decreases, and an amount of light in a specific region increases over time to a predetermined amount, the specific region being a region other than the first region, the another first region, and the second region inside a frame surrounding the first region, the another first region, and at least a part of a region between the first region and the another first region.

8. The vehicle headlight according to claim 7, wherein the control unit controls the light unit such that a total amount of light that decreases in the first region and the another first region is equal to a total amount of light that increases in the second region and the specific region.

9. The vehicle headlight according to claim 7, wherein the control unit controls the light unit such that a region where the amount of light increases of the specific region spreads over time from a second region side toward an another first region side.

10. The vehicle headlight according to claim 9, wherein the control unit controls the light unit such that, during a period in which the amount of light in the specific region increases, a light increase rate in the region where the amount of light increases of the specific region based on a case where no predetermined object is located in front of the vehicle is equal to a light increase rate in the second region based on the case.

11. The vehicle headlight according to claim 7, wherein the control unit controls the light unit such that a region where the amount of light increases of the specific region spreads over time from an another first region side toward a second region side.

12. The vehicle headlight according to claim 7, wherein the control unit controls the light unit such that the amount of light increases over time in the entire specific region.

13. The vehicle headlight according to claim 7, wherein the control unit controls the light unit such that a light increase rate in the specific region based on a case where no predetermined object is located in front of the vehicle is equal to a light increase rate in the second region based on the case, in a state where the amount of light in the specific region has reached the predetermined amount.

14. The vehicle headlight according to claim 13, wherein the control unit controls the light unit such that, during at least a part of a period in which the amount of light in the specific region increases, an amount of light in a region that is not located inside the frame of the second region decreases over time and returns to an amount of light when no predetermined object is located in front of the vehicle.

15. The vehicle headlight according to claim 7, wherein the control unit controls the light unit such that the frame has a minimum rectangular shape.

16. The vehicle headlight according to claim 7, wherein the control unit controls the light unit such that, as the specific region has a larger area, a period until the amount of light in the specific region reaches the predetermined amount is longer.

17. The vehicle headlight according to claim 7, wherein the control unit controls the light unit such that, as a distance between the first region and the another first region is longer, a period until the amount of light in the specific region reaches the predetermined amount is longer.

18. The vehicle headlight according to claim 7, wherein the control unit controls the light unit such that the frame coincides with an edge of the light distribution pattern when a ratio of a sum of areas of the first region and the another first region to an entire area of the light distribution pattern is equal to or higher than a predetermined value.

19. The vehicle headlight according to claim 7, wherein in the first state in which a plurality of predetermined objects is present, the control unit controls the light unit such that an amount of light decreases in a plurality of first regions corresponding to the respective predetermined objects, and the second region surrounds the plurality of first regions and includes at least a part of a region between adjacent ones of the first regions, and when the first state is changed to the second state, the control unit controls the light unit such that the frame surrounds the first regions, the another first region, and at least a part of a region between adjacent ones among the plurality of the first regions and the another first region, and the specific region is a region other than the first regions, the another first region, and the second region inside the frame.

20. The vehicle headlight according to claim 19, wherein the control unit controls the light unit such that the frame coincides with an edge of the light distribution pattern when a total number of predetermined objects and other predetermined objects is equal to or larger than a predetermined number.

* * * * *